United States Patent
Dayal

(10) Patent No.: US 9,576,460 B2
(45) Date of Patent: Feb. 21, 2017

(54) WEARABLE SMART DEVICE FOR HAZARD DETECTION AND WARNING BASED ON IMAGE AND AUDIO DATA

(71) Applicant: Toyota Motor Engineering & Manufacturing North America, Inc., Erlanger, KY (US)

(72) Inventor: Rajiv Dayal, Santa Clara, CA (US)

(73) Assignee: TOYOTA MOTOR ENGINEERING & MANUFACTURING NORTH AMERICA, INC., Erlanger, KY (US)

(*) Notice: Subject to any disclaimer, the term of this patent is extended or adjusted under 35 U.S.C. 154(b) by 0 days.

(21) Appl. No.: 14/601,506

(22) Filed: Jan. 21, 2015

(65) Prior Publication Data

US 2016/0210834 A1    Jul. 21, 2016

(51) Int. Cl.
  *H04N 5/232*  (2006.01)
  *G08B 21/02*  (2006.01)
  *G01C 21/36*  (2006.01)

(52) U.S. Cl.
  CPC ........... *G08B 21/02* (2013.01); *G01C 21/3691* (2013.01)

(58) Field of Classification Search
  CPC ..... H04R 25/70; H04R 2225/55; G06F 3/016; H04M 1/6041; H04M 2250/20
  See application file for complete search history.

(56) References Cited

U.S. PATENT DOCUMENTS

| | | |
|---|---|---|
| 4,520,501 A | 5/1985 | DuBrucq |
| 4,586,827 A | 5/1986 | Hirsch et al. |
| 5,047,952 A | 9/1991 | Kramer |
| 5,097,856 A | 3/1992 | Chi-Sheng |
| 5,129,716 A | 7/1992 | Holakovszky et al. |
| 5,265,272 A | 11/1993 | Kurcbart |
| 5,463,428 A | 10/1995 | Lipton et al. |
| 5,508,699 A | 4/1996 | Silverman |
| 5,539,665 A | 7/1996 | Lamming et al. |
| 5,543,802 A | 8/1996 | Villevieille |
| 5,544,050 A | 8/1996 | Abe |

(Continued)

FOREIGN PATENT DOCUMENTS

| | | |
|---|---|---|
| CN | 201260746 | 6/2009 |
| CN | 101527093 | 9/2009 |

(Continued)

OTHER PUBLICATIONS

Caperna et al.; "A Navigation and Object Location Device for the Blind"; Tech. rep. University of Maryland College Park; 129 pages; 2009.

(Continued)

*Primary Examiner* — Amy Hsu
(74) *Attorney, Agent, or Firm* — Snell & Wilmer LLP

(57) ABSTRACT

A wearable smart device for providing hazard warning information to a user. The wearable smart device includes a microphone configured to detect audio data associated with a potential hazard. The wearable smart device also includes a camera configured to detect image data associated with the potential hazard. The wearable smart device also includes a processor coupled to the microphone and the camera and configured to determine whether the potential hazard presents a real hazard based on the detected audio data and the detected image data.

22 Claims, 12 Drawing Sheets

(56) References Cited

U.S. PATENT DOCUMENTS

| | | |
|---|---|---|
| 5,568,127 A * | 10/1996 | Bang .................. G08B 21/06 116/1 |
| 5,636,038 A | 6/1997 | Lynt |
| 5,659,764 A | 8/1997 | Sakiyama |
| 5,701,356 A | 12/1997 | Stanford et al. |
| 5,733,127 A | 3/1998 | Mecum |
| 5,807,111 A | 9/1998 | Schrader |
| 5,872,744 A | 2/1999 | Taylor |
| 5,953,693 A | 9/1999 | Sakiyama |
| 5,956,630 A | 9/1999 | Mackey |
| 5,982,286 A | 11/1999 | Vanmoor |
| 6,009,577 A | 1/2000 | Day |
| 6,055,048 A | 4/2000 | Langevin et al. |
| 6,067,112 A | 5/2000 | Wellner et al. |
| 6,199,010 B1 | 3/2001 | Richton |
| 6,229,901 B1 | 5/2001 | Mickelson et al. |
| 6,230,135 B1 | 5/2001 | Ramsay |
| 6,230,349 B1 | 5/2001 | Silver et al. |
| 6,285,757 B1 | 9/2001 | Carroll et al. |
| 6,307,526 B1 | 10/2001 | Mann |
| 6,323,807 B1 | 11/2001 | Golding et al. |
| 6,349,001 B1 * | 2/2002 | Spitzer .................. G02B 27/017 345/8 |
| 6,466,232 B1 | 10/2002 | Newell |
| 6,542,623 B1 | 4/2003 | Kahn |
| 6,580,999 B2 | 6/2003 | Maruyama et al. |
| 6,594,370 B1 | 7/2003 | Anderson |
| 6,603,863 B1 | 8/2003 | Nagayoshi et al. |
| 6,619,836 B1 | 9/2003 | Silvant et al. |
| 6,701,296 B1 | 3/2004 | Kramer |
| 6,774,788 B1 | 8/2004 | Balfe |
| 6,825,875 B1 | 11/2004 | Strub et al. |
| 6,826,477 B2 | 11/2004 | Ladetto et al. |
| 6,834,373 B2 | 12/2004 | Dieberger |
| 6,839,667 B2 | 1/2005 | Reich |
| 6,857,775 B1 | 2/2005 | Wilson |
| 6,920,229 B2 | 7/2005 | Boesen |
| D513,997 S | 1/2006 | Wilson |
| 7,027,874 B1 | 4/2006 | Sawan et al. |
| D522,300 S | 6/2006 | Roberts |
| 7,069,215 B1 | 6/2006 | Bangalore |
| 7,106,220 B2 | 9/2006 | Gourgey et al. |
| 7,228,275 B1 | 6/2007 | Endo |
| 7,299,034 B2 | 11/2007 | Kates |
| 7,308,314 B2 | 12/2007 | Havey et al. |
| 7,336,226 B2 | 2/2008 | Jung et al. |
| 7,356,473 B2 | 4/2008 | Kates |
| 7,413,554 B2 | 8/2008 | Kobayashi et al. |
| 7,417,592 B1 | 8/2008 | Hsiao et al. |
| 7,428,429 B2 | 9/2008 | Gantz et al. |
| 7,463,188 B1 | 12/2008 | McBurney |
| 7,496,445 B2 | 2/2009 | Mohsini |
| 7,501,958 B2 | 3/2009 | Saltzstein et al. |
| 7,564,469 B2 | 7/2009 | Cohen |
| 7,565,295 B1 | 7/2009 | Hernandez-Rebollar |
| 7,598,976 B2 | 10/2009 | Sofer et al. |
| 7,618,260 B2 | 11/2009 | Daniel et al. |
| D609,818 S | 2/2010 | Tsang et al. |
| 7,656,290 B2 | 2/2010 | Fein et al. |
| 7,659,915 B2 | 2/2010 | Kurzweil et al. |
| 7,743,996 B2 | 6/2010 | Maciver |
| D625,427 S | 10/2010 | Lee |
| 7,843,488 B2 | 11/2010 | Stapleton |
| 7,848,512 B2 | 12/2010 | Eldracher |
| 7,864,991 B2 | 1/2011 | Espenlaub et al. |
| 7,938,756 B2 | 5/2011 | Rodetsky et al. |
| 7,991,576 B2 | 8/2011 | Roumeliotis |
| 8,005,263 B2 | 8/2011 | Fujimura |
| 8,035,519 B2 | 10/2011 | Davis |
| D649,655 S | 11/2011 | Petersen |
| 8,123,660 B2 | 2/2012 | Kruse et al. |
| D656,480 S | 3/2012 | McManigal et al. |
| 8,138,907 B2 | 3/2012 | Barbeau et al. |
| 8,150,107 B2 | 4/2012 | Kurzweil et al. |
| 8,177,705 B2 | 5/2012 | Abolfathi |
| 8,239,032 B2 | 8/2012 | Dewhurst |
| 8,253,760 B2 | 8/2012 | Sako et al. |
| 8,300,862 B2 | 10/2012 | Newton et al. |
| 8,325,263 B2 | 12/2012 | Kato et al. |
| D674,501 S | 1/2013 | Petersen |
| 8,359,122 B2 | 1/2013 | Koselka et al. |
| 8,395,968 B2 | 3/2013 | Vartanian et al. |
| 8,401,785 B2 | 3/2013 | Cho et al. |
| 8,414,246 B2 | 4/2013 | Tobey |
| 8,418,705 B2 | 4/2013 | Ota et al. |
| 8,428,643 B2 | 4/2013 | Lin |
| 8,483,956 B2 | 7/2013 | Zhang |
| 8,494,507 B1 | 7/2013 | Tedesco et al. |
| 8,494,859 B2 | 7/2013 | Said |
| 8,538,687 B2 | 9/2013 | Plocher et al. |
| 8,538,688 B2 | 9/2013 | Prehofer |
| 8,571,860 B2 | 10/2013 | Strope |
| 8,583,282 B2 | 11/2013 | Angle et al. |
| 8,588,464 B2 * | 11/2013 | Albertson .............. A61H 3/061 340/435 |
| 8,588,972 B2 | 11/2013 | Fung |
| 8,594,935 B2 | 11/2013 | Cioffi et al. |
| 8,606,316 B2 | 12/2013 | Evanitsky |
| 8,610,879 B2 | 12/2013 | Ben-Moshe et al. |
| 8,630,633 B1 | 1/2014 | Tedesco et al. |
| 8,676,274 B2 | 3/2014 | Li |
| 8,676,623 B2 | 3/2014 | Gale et al. |
| 8,694,251 B2 | 4/2014 | Janardhanan et al. |
| 8,704,902 B2 | 4/2014 | Naick et al. |
| 8,743,145 B1 | 6/2014 | Price |
| 8,750,898 B2 | 6/2014 | Haney |
| 8,768,071 B2 | 7/2014 | Tsuchinaga et al. |
| 8,786,680 B2 | 7/2014 | Shiratori |
| 8,797,141 B2 | 8/2014 | Best et al. |
| 8,797,386 B2 | 8/2014 | Chou et al. |
| 8,803,699 B2 | 8/2014 | Foshee et al. |
| 8,814,019 B2 | 8/2014 | Dyster et al. |
| 8,825,398 B2 | 9/2014 | Alexandre |
| 8,836,532 B2 | 9/2014 | Fish, Jr. et al. |
| 8,836,580 B2 | 9/2014 | Mendelson |
| 8,836,910 B2 | 9/2014 | Cashin et al. |
| 8,902,303 B2 | 12/2014 | Na'Aman et al. |
| 8,909,534 B1 | 12/2014 | Heath |
| D721,673 S | 1/2015 | Park et al. |
| 8,926,330 B2 | 1/2015 | Taghavi |
| 8,930,458 B2 | 1/2015 | Lewis et al. |
| 8,981,682 B2 | 3/2015 | Delson et al. |
| D727,194 S | 4/2015 | Wilson |
| 9,004,330 B2 | 4/2015 | White |
| 9,025,016 B2 | 5/2015 | Wexler et al. |
| 9,053,094 B2 | 6/2015 | Yassa |
| 9,076,450 B1 | 7/2015 | Sadek |
| 9,081,079 B2 | 7/2015 | Chao et al. |
| 9,081,385 B1 | 7/2015 | Ferguson |
| D736,741 S | 8/2015 | Katz |
| 9,111,545 B2 | 8/2015 | Jadhav et al. |
| D738,238 S | 9/2015 | Pede et al. |
| 9,137,484 B2 | 9/2015 | DiFrancesco et al. |
| 9,137,639 B2 | 9/2015 | Garin et al. |
| 9,140,554 B2 | 9/2015 | Jerauld |
| 9,148,191 B2 | 9/2015 | Teng et al. |
| 9,158,378 B2 | 10/2015 | Hirukawa |
| D742,535 S | 11/2015 | Wu |
| D743,933 S | 11/2015 | Park et al. |
| 9,190,058 B2 | 11/2015 | Klein |
| 9,230,430 B2 | 1/2016 | Civelli et al. |
| 9,232,366 B1 | 1/2016 | Charlier et al. |
| 9,267,801 B2 | 2/2016 | Gupta et al. |
| 9,269,015 B2 | 2/2016 | Boncyk |
| 9,304,588 B2 | 4/2016 | Aldossary |
| D756,958 S | 5/2016 | Lee et al. |
| D756,959 S | 5/2016 | Lee et al. |
| 9,335,175 B2 | 5/2016 | Zhang et al. |
| 9,341,014 B2 | 5/2016 | Oshima et al. |
| 9,355,547 B2 | 5/2016 | Stevens et al. |
| 2001/0023387 A1 | 9/2001 | Rollo |
| 2002/0067282 A1 | 6/2002 | Moskowitz et al. |
| 2002/0071277 A1 | 6/2002 | Starner et al. |
| 2002/0075323 A1 | 6/2002 | O'Dell |

(56) References Cited

U.S. PATENT DOCUMENTS

| | | |
|---|---|---|
| 2002/0173346 A1 | 11/2002 | Wang |
| 2002/0178344 A1 | 11/2002 | Bourguet |
| 2003/0026461 A1* | 2/2003 | Arthur Hunter .......... A61F 9/08 382/114 |
| 2003/0133085 A1 | 7/2003 | Tretiakoff |
| 2003/0179133 A1 | 9/2003 | Pepin et al. |
| 2004/0232179 A1 | 11/2004 | Chauhan |
| 2004/0267442 A1 | 12/2004 | Fehr et al. |
| 2005/0208457 A1 | 9/2005 | Fink et al. |
| 2005/0221260 A1 | 10/2005 | Kikuchi |
| 2006/0004512 A1 | 1/2006 | Herbst |
| 2006/0028550 A1 | 2/2006 | Palmer |
| 2006/0029256 A1 | 2/2006 | Miyoshi |
| 2006/0129308 A1 | 6/2006 | Kates |
| 2006/0171704 A1 | 8/2006 | Bingle et al. |
| 2006/0177086 A1 | 8/2006 | Rye et al. |
| 2006/0184318 A1 | 8/2006 | Yoshimine |
| 2006/0292533 A1 | 12/2006 | Selod |
| 2007/0001904 A1 | 1/2007 | Mendelson |
| 2007/0052672 A1 | 3/2007 | Ritter et al. |
| 2007/0173688 A1 | 7/2007 | Kim |
| 2007/0296572 A1 | 12/2007 | Fein |
| 2008/0024594 A1 | 1/2008 | Ritchey |
| 2008/0068559 A1 | 3/2008 | Howell |
| 2008/0120029 A1 | 5/2008 | Zelek et al. |
| 2008/0145822 A1 | 6/2008 | Bucchieri |
| 2008/0174676 A1* | 7/2008 | Squilla .............. G06F 17/30056 348/231.6 |
| 2008/0198222 A1 | 8/2008 | Gowda |
| 2008/0198324 A1 | 8/2008 | Fuziak |
| 2008/0251110 A1 | 10/2008 | Pede |
| 2008/0260210 A1 | 10/2008 | Kobeli |
| 2009/0012788 A1 | 1/2009 | Gilbert |
| 2009/0040215 A1 | 2/2009 | Afzulpurkar |
| 2009/0118652 A1 | 5/2009 | Carlucci |
| 2009/0122161 A1 | 5/2009 | Bolkhovitinov |
| 2009/0122648 A1 | 5/2009 | Mountain et al. |
| 2009/0157302 A1 | 6/2009 | Tashev et al. |
| 2009/0177437 A1 | 7/2009 | Roumeliotis |
| 2009/0189974 A1 | 7/2009 | Deering |
| 2010/0041378 A1 | 2/2010 | Aceves |
| 2010/0109918 A1 | 5/2010 | Liebermann |
| 2010/0110368 A1 | 5/2010 | Chaum |
| 2010/0179452 A1 | 7/2010 | Srinivasan |
| 2010/0182242 A1 | 7/2010 | Fields et al. |
| 2010/0182450 A1 | 7/2010 | Kumar |
| 2010/0198494 A1 | 8/2010 | Chao |
| 2010/0199232 A1 | 8/2010 | Mistry et al. |
| 2010/0241350 A1 | 9/2010 | Cioffi et al. |
| 2010/0245585 A1 | 9/2010 | Fisher et al. |
| 2010/0267276 A1 | 10/2010 | Wu |
| 2010/0292917 A1 | 11/2010 | Emam et al. |
| 2010/0298976 A1 | 11/2010 | Sugihara et al. |
| 2010/0305845 A1 | 12/2010 | Alexandre et al. |
| 2010/0308999 A1 | 12/2010 | Chornenky |
| 2011/0066383 A1 | 3/2011 | Jangle |
| 2011/0071830 A1 | 3/2011 | Kim |
| 2011/0092249 A1 | 4/2011 | Evanitsky |
| 2011/0124383 A1 | 5/2011 | Garra et al. |
| 2011/0181422 A1* | 7/2011 | Tran .................... G06F 19/3418 340/573.1 |
| 2011/0187640 A1 | 8/2011 | Jacobsen |
| 2011/0211760 A1 | 9/2011 | Boncyk |
| 2011/0216006 A1 | 9/2011 | Litschel |
| 2011/0221670 A1 | 9/2011 | King, III et al. |
| 2011/0260681 A1 | 10/2011 | Guccione |
| 2011/0307172 A1 | 12/2011 | Jadhav et al. |
| 2012/0016578 A1 | 1/2012 | Coppens |
| 2012/0053826 A1 | 3/2012 | Slamka |
| 2012/0062357 A1 | 3/2012 | Slamka |
| 2012/0069511 A1 | 3/2012 | Azera |
| 2012/0075168 A1 | 3/2012 | Osterhout et al. |
| 2012/0085377 A1 | 4/2012 | Trout |
| 2012/0092161 A1 | 4/2012 | West |
| 2012/0092460 A1* | 4/2012 | Mahoney ........... G06K 9/00664 348/46 |
| 2012/0123784 A1 | 5/2012 | Baker et al. |
| 2012/0136666 A1 | 5/2012 | Corpier et al. |
| 2012/0143495 A1 | 6/2012 | Dantu |
| 2012/0162423 A1* | 6/2012 | Xiao .................... B60R 25/305 348/148 |
| 2012/0194552 A1 | 8/2012 | Osterhout et al. |
| 2012/0206335 A1 | 8/2012 | Osterhout et al. |
| 2012/0206607 A1 | 8/2012 | Morioka |
| 2012/0207356 A1* | 8/2012 | Murphy ............. H04N 1/00137 382/115 |
| 2012/0214418 A1 | 8/2012 | Lee |
| 2012/0220234 A1* | 8/2012 | Abreu .................... G02C 3/003 455/41.2 |
| 2012/0232430 A1 | 9/2012 | Boissy et al. |
| 2012/0249797 A1* | 10/2012 | Haddick ................. G06F 1/163 348/158 |
| 2012/0252483 A1 | 10/2012 | Farmer et al. |
| 2012/0316884 A1 | 12/2012 | Rozaieski et al. |
| 2012/0323485 A1 | 12/2012 | Mutoh |
| 2012/0327194 A1 | 12/2012 | Shiratori |
| 2013/0002452 A1 | 1/2013 | Lauren |
| 2013/0044005 A1* | 2/2013 | Foshee ................. G09B 21/007 340/691.1 |
| 2013/0046541 A1 | 2/2013 | Klein et al. |
| 2013/0066636 A1 | 3/2013 | Singhal |
| 2013/0079061 A1 | 3/2013 | Jadhav |
| 2013/0115579 A1* | 5/2013 | Taghavi ................. G06F 3/016 434/113 |
| 2013/0116559 A1 | 5/2013 | Levin |
| 2013/0127980 A1 | 5/2013 | Haddick |
| 2013/0128051 A1 | 5/2013 | Velipasalar et al. |
| 2013/0131985 A1 | 5/2013 | Weiland et al. |
| 2013/0141576 A1* | 6/2013 | Lord ...................... G08G 1/04 348/148 |
| 2013/0155474 A1 | 6/2013 | Roach et al. |
| 2013/0157230 A1 | 6/2013 | Morgan |
| 2013/0184982 A1 | 7/2013 | DeLuca |
| 2013/0202274 A1 | 8/2013 | Chan |
| 2013/0211718 A1 | 8/2013 | Yoo et al. |
| 2013/0218456 A1 | 8/2013 | Zelek et al. |
| 2013/0228615 A1 | 9/2013 | Gates et al. |
| 2013/0229669 A1 | 9/2013 | Smits |
| 2013/0245396 A1 | 9/2013 | Berman et al. |
| 2013/0250078 A1 | 9/2013 | Levy |
| 2013/0250233 A1 | 9/2013 | Blum et al. |
| 2013/0253818 A1 | 9/2013 | Sanders et al. |
| 2013/0271584 A1 | 10/2013 | Wexler et al. |
| 2013/0290909 A1 | 10/2013 | Gray |
| 2013/0307842 A1 | 11/2013 | Grinberg et al. |
| 2013/0311179 A1 | 11/2013 | Wagner |
| 2013/0328683 A1 | 12/2013 | Sitbon et al. |
| 2013/0332452 A1 | 12/2013 | Jarvis |
| 2014/0009561 A1 | 1/2014 | Sutherland |
| 2014/0031081 A1 | 1/2014 | Vossoughi |
| 2014/0031977 A1 | 1/2014 | Goldenberg et al. |
| 2014/0032596 A1 | 1/2014 | Fish et al. |
| 2014/0037149 A1 | 2/2014 | Zetune |
| 2014/0071234 A1 | 3/2014 | Millett |
| 2014/0081631 A1 | 3/2014 | Zhu et al. |
| 2014/0085446 A1* | 3/2014 | Hicks ................... G09B 21/001 348/62 |
| 2014/0098018 A1 | 4/2014 | Kim et al. |
| 2014/0100773 A1 | 4/2014 | Cunningham et al. |
| 2014/0125700 A1 | 5/2014 | Ramachandran |
| 2014/0132388 A1 | 5/2014 | Alalawi |
| 2014/0133290 A1 | 5/2014 | Yokoo |
| 2014/0184384 A1* | 7/2014 | Zhu ...................... G09B 21/007 340/4.12 |
| 2014/0222023 A1 | 8/2014 | Kim et al. |
| 2014/0251396 A1 | 9/2014 | Subhashrao et al. |
| 2014/0253702 A1 | 9/2014 | Wexler |
| 2014/0278070 A1 | 9/2014 | McGavran |
| 2014/0281943 A1 | 9/2014 | Prilepov |
| 2014/0287382 A1 | 9/2014 | Villar Cloquell |
| 2014/0309806 A1 | 10/2014 | Ricci |
| 2014/0313040 A1 | 10/2014 | Wright, Sr. |

(56) References Cited

U.S. PATENT DOCUMENTS

| | | | |
|---|---|---|---|
| 2014/0335893 A1 | 11/2014 | Ronen | |
| 2014/0343846 A1 | 11/2014 | Goldman et al. | |
| 2014/0345956 A1 | 11/2014 | Kojina | |
| 2014/0347265 A1 | 11/2014 | Aimone | |
| 2014/0368412 A1 | 12/2014 | Jacobsen | |
| 2014/0369541 A1 | 12/2014 | Miskin | |
| 2014/0379336 A1 | 12/2014 | Bhatnagar | |
| 2015/0002808 A1* | 1/2015 | Rizzo, III | A61F 9/08 351/158 |
| 2015/0016035 A1 | 1/2015 | Tussy | |
| 2015/0063661 A1 | 3/2015 | Lee | |
| 2015/0081884 A1 | 3/2015 | Maguire | |
| 2015/0099946 A1 | 4/2015 | Sahin | |
| 2015/0109107 A1 | 4/2015 | Gomez et al. | |
| 2015/0120186 A1 | 4/2015 | Heikes | |
| 2015/0125831 A1 | 5/2015 | Chandrashekhar Nair et al. | |
| 2015/0141085 A1 | 5/2015 | Nuovo et al. | |
| 2015/0142891 A1 | 5/2015 | Haque | |
| 2015/0154643 A1 | 6/2015 | Artman et al. | |
| 2015/0196101 A1 | 7/2015 | Dayal et al. | |
| 2015/0198454 A1* | 7/2015 | Moore | G06F 3/167 701/428 |
| 2015/0198455 A1 | 7/2015 | Chen | |
| 2015/0199566 A1* | 7/2015 | Moore | G06K 9/00442 348/47 |
| 2015/0201181 A1* | 7/2015 | Moore | H04N 13/0239 348/47 |
| 2015/0211858 A1 | 7/2015 | Jerauld | |
| 2015/0219757 A1 | 8/2015 | Boelter et al. | |
| 2015/0223355 A1 | 8/2015 | Fleck | |
| 2015/0256977 A1 | 9/2015 | Huang | |
| 2015/0257555 A1 | 9/2015 | Wong | |
| 2015/0260474 A1 | 9/2015 | Rublowsky | |
| 2015/0262509 A1 | 9/2015 | Labb | |
| 2015/0279172 A1 | 10/2015 | Hyde | |
| 2015/0330787 A1 | 11/2015 | Cioffi et al. | |
| 2015/0336276 A1 | 11/2015 | Song | |
| 2015/0341591 A1* | 11/2015 | Kelder | H04N 7/013 386/285 |
| 2015/0346496 A1 | 12/2015 | Haddick et al. | |
| 2015/0356837 A1 | 12/2015 | Pajestka | |
| 2015/0364943 A1 | 12/2015 | Vick | |
| 2015/0367176 A1 | 12/2015 | Bejestan | |
| 2015/0375395 A1 | 12/2015 | Kwon | |
| 2016/0007158 A1 | 1/2016 | Venkatraman | |
| 2016/0028917 A1 | 1/2016 | Wexler | |
| 2016/0042228 A1 | 2/2016 | Opalka | |
| 2016/0098138 A1 | 4/2016 | Park | |
| 2016/0156850 A1 | 6/2016 | Werblin et al. | |
| 2016/0198319 A1 | 7/2016 | Huang | |

FOREIGN PATENT DOCUMENTS

| | | |
|---|---|---|
| CN | 201440733 | 4/2010 |
| CN | 101803988 | 8/2010 |
| CN | 101647745 | 1/2011 |
| CN | 102316193 | 1/2012 |
| CN | 102631280 | 8/2012 |
| CN | 202547659 | 11/2012 |
| CN | 202722736 U | 2/2013 |
| CN | 102323819 | 6/2013 |
| CN | 103445920 | 12/2013 |
| DE | 102011080056 | 1/2013 |
| DE | 102012000587 | 7/2013 |
| DE | 102012202614 | 8/2013 |
| EP | 1174049 | 9/2004 |
| EP | 1721237 | 11/2006 |
| EP | 2368455 | 9/2011 |
| EP | 2371339 | 10/2011 |
| EP | 2127033 | 8/2012 |
| EP | 2581856 | 4/2013 |
| EP | 2751775 | 7/2016 |
| FR | 2885251 | 11/2006 |
| GB | 2401752 | 11/2004 |
| JP | 1069539 | 3/1998 |
| JP | 2001304908 | 10/2001 |
| JP | 2010012529 | 1/2010 |
| JP | 2010182193 | 8/2010 |
| JP | 2013169611 | 9/2013 |
| KR | 100405636 | 11/2003 |
| KR | 20080080688 | 9/2008 |
| KR | 20120020212 | 3/2012 |
| KR | 1250929 | 4/2013 |
| WO | WO9504440 | 2/1995 |
| WO | WO 9949656 | 9/1999 |
| WO | WO 0010073 | 2/2000 |
| WO | WO 0038393 | 6/2000 |
| WO | WO 0179956 | 10/2001 |
| WO | WO 2004/076974 | 9/2004 |
| WO | WO 2006/028354 | 3/2006 |
| WO | WO 2006/045819 | 5/2006 |
| WO | WO 2007/031782 | 3/2007 |
| WO | WO 2008/008791 | 1/2008 |
| WO | WO 2008015375 | 2/2008 |
| WO | WO 2008/035993 | 3/2008 |
| WO | WO 2008/096134 | 8/2008 |
| WO | WO2008127316 | 10/2008 |
| WO | WO 2010/062481 | 6/2010 |
| WO | WO 2010/109313 | 9/2010 |
| WO | WO 2012/040703 | 3/2012 |
| WO | WO2012163675 | 12/2012 |
| WO | WO 2013/045557 | 4/2013 |
| WO | WO 2013/054257 | 4/2013 |
| WO | WO 2013/067539 | 5/2013 |
| WO | WO 2013/147704 | 10/2013 |
| WO | WO 2014104531 | 7/2014 |
| WO | WO 2014/138123 | 9/2014 |
| WO | WO 2014/172378 | 10/2014 |
| WO | WO 2015065418 | 5/2015 |
| WO | WO2015092533 | 6/2015 |
| WO | WO 2015108882 | 7/2015 |
| WO | WO2015127062 | 8/2015 |

OTHER PUBLICATIONS

Burbey et al.; "Human Information Processing with the Personal Memex"; ISE 5604 Fall 2005; 88 pages; Dec. 6, 2005.
Ghiani, et al.; "Vibrotactile Feedback to Aid Blind Users of Mobile Guides"; Journal of Visual Languages and Computing 20; pp. 305-317; 2009.
The Nex Band; http://www.mightycast.com/#faq; May 19, 2015; 4 pages.
Cardonha et al.; "A Crowdsourcing Platform for the Construction of Accessibility Maps"; W4A'13 Proceedings of the 10th International Cross-Disciplinary Conference on Web Accessibility; Article No. 26; 2013; 5 pages.
Bujacz et al.; "Remote Guidance for the Blind—A Proposed Teleassistance System and Navigation Trials"; Conference on Human System Interactions; May 25-27, 2008; 6 pages.
Rodriguez et al; "CrowdSight: Rapidly Prototyping Intelligent Visual Processing Apps"; AAAI Human Computation Workshop (HCOMP); 2011; 6 pages.
Chaudary et al.; "Alternative Navigation Assistance Aids for Visually Impaired Blind Persons"; Proceedings of ICEAPVI; Feb. 12-14, 2015; 5 pages.
Garaj et al.; "A System for Remote Sighted Guidance of Visually Impaired Pedestrians"; The British Journal of Visual Impairment; vol. 21, No. 2, 2003; 9 pages.
Coughlan et al.; "Crosswatch: A System for Providing Guidance to Visually Impaired Travelers at Traffic Intersections"; Journal of Assistive Technologies 7.2; 2013; 17 pages.
Sudol et al.; "LookTel—A Comprehensive Platform for Computer-Aided Visual Assistance"; Computer Vision and Pattern Recognition Workshops (CVPRW), 2010 IEEE Computer Society Conference; Jun. 13-18, 2010; 8 pages.
Paladugu et al.; "GoingEasy® with Crowdsourcing in the Web 2.0 World for Visually Impaired Users: Design and User Study"; Arizona State University; 8 pages.

(56) References Cited

OTHER PUBLICATIONS

Kammoun et al.; "*Towards a Geographic Information System Facilitating Navigation of Visually Impaired Users*"; Springer Berlin Heidelberg; 2012; 8 pages.

Bigham et al.; "*VizWiz: Nearly Real-Time Answers to Visual Questions*" Proceedings of the 23nd annual ACM symposium on User interface software and technology; 2010; 2 pages.

Guy et al; "*CrossingGuard: Exploring Information Content in Navigation Aids for Visually Impaired Pedestrians*" Proceedings of the SIGCHI Conference on Human Factors in Computing Systems; May 5-10, 2012; 10 pages.

Zhang et al.; "*A Multiple Sensor-Based Shoe-Mounted User Interface Designed for Navigation Systems for the Visually Impaired*"; $5^{th}$ Annual ICST Wireless Internet Conference (WICON); Mar. 1-3, 2010; 9 pages.

Shoval et al.; "*Navbelt and the Guidecane—Robotics-Based Obstacle-Avoidance Systems for the Blind and Visually Impaired*"; IEEE Robotics & Automation Magazine, vol. 10, Issue 1; Mar. 2003; 12 pages.

Dowling et al.; "*Intelligent Image Processing Constraints for Blind Mobility Facilitated Through Artificial Vision*"; $8^{th}$ Australian and NewZealand Intelligent Information Systems Conference (ANZIIS); Dec. 10-12, 2003; 7 pages.

Heyes, Tony; "*The Sonic Pathfinder an Electronic Travel Aid for the Vision Impaired*"; http://members.optuszoo.com.au/aheyew40/pa/pf_blerf.html; Dec. 11, 2014; 7 pages.

Lee et al.; "*Adaptive Power Control of Obstacle Avoidance System Using Via Motion Context for Visually Impaired Person.*" International Conference on Cloud Computing and Social Networking (ICCCSN), Apr. 26-27, 2012 4 pages.

Wilson, Jeff, et al. "*Swan: System for Wearable Audio Navigation*"; 11th IEEE International Symposium on Wearable Computers; Oct. 11-13, 2007; 8 pages.

Borenstein et al.; "*The GuideCane—A Computerized Travel Aid for the Active Guidance of Blind Pedestrians*"; IEEE International Conference on Robotics and Automation; Apr. 21-27, 1997; 6 pages.

Bhatlawande et al.; "*Way-finding Electronic Bracelet for Visually Impaired People*"; IEEE Point-of-Care Healthcare Technologies (PHT), Jan. 16-18, 2013; 4 pages.

Blenkhorn et al.; "*An Ultrasonic Mobility Device with Minimal Audio Feedback*"; Center on Disabilities Technology and Persons with Disabilities Conference; Nov. 22, 1997; 5 pages.

Mann et al.; "*Blind Navigation with a Wearable Range Camera and Vibrotactile Helmet*"; $19^{th}$ ACM International Conference on Multimedia; Nov. 28, 2011; 4 pages.

Shoval et al.; "*The Navbelt—A Computerized Travel Aid for the Blind*"; RESNA Conference, Jun. 12-17, 1993; 6 pages.

Kumar et al.; "*An Electronic Travel Aid for Navigation of Visually Impaired Persons*"; Communications Systems and Networks (COMSNETS), 2011 Third International Conference; Jan. 2011; 5 pages.

Pawar et al.; "*Multitasking Stick for Indicating Safe Path to Visually Disable People*"; IOSR Journal of Electronics and Communication Engineering (IOSR-JECE), vol. 10, Issue 3, Ver. II; May-Jun. 2015; 5 pages.

Pagliarini et al.; "*Robotic Art for Wearable*"; Proceedings of EUROSIAM: European Conference for the Applied Mathematics and Informatics 2010; 10 pages.

Greenberg et al.; "*Finding Your Way: A Curriculum for Teaching and Using the Braillenote with Sendero GPS 2011*"; California School for the Blind; 2011; 190 pages.

Helal et al.; "*Drishti: An Integrated Navigation System for Visually Impaired and Disabled*"; Fifth International Symposium on Wearable Computers; Oct. 8-9, 2001; 8 pages.

Parkes, Don; "*Audio Tactile Systems for Designing and Learning Complex Environments as a Vision Impaired Person: Static and Dynamic Spatial Information Access*"; EdTech-94 Proceedings; 1994; 8 pages.

Zeng et al.; "*Audio-Haptic Browser for a Geographical Information System*"; ICCHP 2010, Part II, LNCS 6180; Jul. 14-16, 2010; 8 pages.

AiZuhair et al.; "*NFC Based Applications for Visually Impaired People—A Review*"; IEEE International Conference on Multimedia and Expo Workshops (ICMEW), Jul. 14, 2014; 7 pages.

Graf, Christian; "*Verbally Annotated Tactile Maps—Challenges and Approaches*"; Spatial Cognition VII, vol. 6222; Aug. 15-19, 2010; 16 pages.

Hamid, Nazatul Naquiah Abd; "*Facilitating Route Learning Using Interactive Audio-Tactile Maps for Blind and Visually Impaired People*"; CHI 2013 Extended Abstracts; Apr. 27, 2013; 6 pages.

Ramya, et al.; "*Voice Assisted Embedded Navigation System for the Visually Impaired*"; International Journal of Computer Applications; vol. 64, No. 13, Feb. 2013; 7 pages.

Guerrero et al.; "*An Indoor Navigation System for the Visually Impaired*"; Sensors vol. 12, Issue 6; Jun. 13, 2012; 23 pages.

Nordin et al.; "*Indoor Navigation and Localization for Visually Impaired People Using Weighted Topological Map*"; Journal of Computer Science vol. 5, Issue 11; 2009; 7 pages.

Hesch et al.; "*Design and Analysis of a Portable Indoor Localization Aid for the Visually Impaired*"; International Journal of Robotics Research; vol. 29; Issue 11; Sep. 2010; 15 pgs.

Joseph et al.; "*Visual Semantic Parameterization—To Enhance Blind User Perception for Indoor Navigation*"; Multimedia and Expo Workshops (ICMEW), 2013 IEEE International Conference; Jul. 15, 2013; 7 pages.

Katz et al; "*NAVIG: Augmented Reality Guidance System for the Visually Impaired*"; Virtual Reality (2012) vol. 16; 2012; 17 pages.

Rodriguez et al.; "*Assisting the Visually Impaired: Obstacle Detection and Warning System by Acoustic Feedback*"; Sensors 2012; vol. 12; 21 pages.

Treuillet; "*Outdoor/Indoor Vision-Based Localization for Blind Pedestrian Navigation Assistance*"; WSPC/Instruction File; May 23, 2010; 16 pages.

Ran et al.; "*Drishti: An Integrated Indoor/Outdoor Blind Navigation System and Service*"; Proceeding PERCOM '04 Proceedings of the Second IEEE International Conference on Pervasive Computing and Communications (PerCom'04); 2004; 9 pages.

Wang, et al.; "*Camera-Based Signage Detection and Recognition for Blind Persons*"; $13^{th}$ International Conference (ICCHP) Part 2 Proceedings; Jul. 11-13, 2012; 9 pages.

Krishna et al.; "*A Systematic Requirements Analysis and Development of an Assistive Device to Enhance the Social Interaction of People Who are Blind or Visually Impaired*"; Workshop on Computer Vision Applications for the Visually Impaired; Marseille, France; 2008; 12 pages.

Lee et al.; "*A Walking Guidance System for the Visually Impaired*"; International Journal of Pattern Recognition and Artificial Intelligence; vol. 22; No. 6; 2008; 16 pages.

Ward et al.; "*Visual Experiences in the Blind Induced by an Auditory Sensory Substitution Device*"; Journal of Consciousness and Cognition; Oct. 2009; 30 pages.

Merino-Garcia, et al.; "*A Head-Mounted Device for Recognizing Text in Natural Sciences*"; CBDAR'11 Proceedings of the $4^{th}$ International Conference on Camera-Based Document Analysis and Recognition; Sep. 22, 2011; 7 pages.

Yi, Chucai; "*Assistive Text Reading from Complex Background for Blind Persons*"; CBDAR'11 Proceedings of the $4^{th}$ International Conference on Camera-Based Document Analysis and Recognition; Sep. 22, 2011; 7 pages.

Yang, et al.; "*Towards Automatic Sign Translation*"; The Interactive Systems Lab, Carnegie Mellon University; 2001; 5 pages.

Meijer, Dr. Peter B.L.; "*Mobile OCR, Face and Object Recognition for the Blind*"; The vOICe, www.seeingwithsound.com/ocr.htm; Apr. 18, 2014; 7 pages.

OMRON; Optical Character Recognition Sensor User's Manual; 2012; 450 pages.

Park, Sungwoo; "*Voice Stick*"; www.yankodesign.com/2008/08/21/voice-stick; Aug. 21, 2008; 4 pages.

Rentschler et al.; "*Intelligent Walkers for the Elderly: Performance and Safety Testing of VA-PAMAID Robotic Walker*"; Department of

(56) References Cited

OTHER PUBLICATIONS

Veterans Affairs Journal of Rehabilitation Research and Development; vol. 40, No. 5; Sep./Oct. 2013; 9pages.
Science Daily; "*Intelligent Walker Designed to Assist the Elderly and People Undergoing Medical Rehabilitation*"; http://www.sciencedaily.com/releases/2008/11/081107072015.htm; Jul. 22, 2014; 4 pages.
Glover et al.; "*A Robotically-Augmented Walker for Older Adults*"; Carnegie Mellon University, School of Computer Science; Aug. 1, 2003; 13 pages.
OrCam; www.orcam.com; Jul. 22, 2014; 3 pages.
Eccles, Lisa; "*Smart Walker Detects Obstacles*"; Electronic Design; http://electronicdesign.com/electromechanical/smart-walker-detects-obstacles; Aug. 20, 2001; 2 pages.
Graft, Birgit; "*An Adaptive Guidance System for Robotic Walking Aids*"; Journal of Computing and Information Technology—CIT 17; 2009; 12 pages.
Frizera et al.; "*The Smart Walkers as Geriatric Assistive Device. The SIMBIOSIS Purpose*"; Gerontechnology, vol. 7, No. 2; Jan. 30, 2008; 6 pages.
Rodriquez-Losada et al.; "*Guido, The Robotic Smart Walker for the Frail Visually Impaired*"; IEEE International Conference on Robotics and Automation (ICRA); Apr. 18-22, 2005; 15 pages.
Kayama et al.; "*Outdoor Environment Recognition and Semi-Autonomous Mobile Vehicle for Supporting Mobility of the Elderly and Disabled People*"; National Institute of Information and Communications Technology, vol. 54, No. 3; Aug. 2007; 11 pages.
Kalra et al.; "*A Braille Writing Tutor to Combat Illiteracy in Developing Communities*"; Carnegie Mellon University Research Showcase, Robotics Institute; 2007; 10 pages.
Blaze Engineering; "*Visually Impaired Resource Guide: Assistive Technology for Students who use Braille*"; Braille 'n Speak Manual; http://www.blaize.com; Nov. 17, 2014; 5 pages.
AppleVis; *An Introduction to Braille Screen Input on iOS 8*; http://www.applevis.com/guides/braille-ios/introduction-braille-screen-input-ios-8, Nov. 16, 2014; 7 pages.
Dias et al.; "*Enhancing an Automated Braille Writing Tutor*"; IEEE/RSJ International Conference on Intelligent Robots and Systems; Oct. 11-15, 2009; 7 pages.
D'Andrea, Frances Mary; "*More than a Perkins Brailler: A Review of the Mountbatten Brailler, Part 1*"; AFB AccessWorld Magazine; vol. 6, No. 1, Jan. 2005; 9 pages.
Trinh et al.; "*Phoneme-based Predictive Text Entry Interface*"; Proceedings of the 16th International ACM SIGACCESS Conference on Computers & Accessibility; Oct. 2014; 2 pgs.
Merri et al.; "*The Instruments for a Blind Teacher of English: The challenge of the board*"; European Journal of Psychology of Education, vol. 20, No. 4 (Dec. 2005), 15 pages.
Kirinic et al.; "*Computers in Education of Children with Intellectual and Related Developmental Disorders*"; International Journal of Emerging Technologies in Learning, vol. 5, 2010, 5 pages.
Campos et al.; "*Design and Evaluation of a Spoken-Feedback Keyboard*"; Department of Information Systems and Computer Science, INESC-ID/IST/Universidade Tecnica de Lisboa, Jul. 2004; 6 pages.

EBAY; MATIN (Made in Korea) Neoprene Canon DSLR Camera Curved Neck Strap #6782; http://www.ebay.com/itm/MATIN-Made-in-Korea-Neoprene-Canon-DSLR-Camera-Curved-Neck-Strap-6782-/281608526018?hash=item41912d18c2:g:~pMAAOSwe-FU6zDa ; 4 pages.
NEWEGG; Motorola S10-HD Bluetooth Stereo Headphone w/ Comfortable Sweat Proof Design; http://www.newegg.com/Product/Product.aspx?Item=9SIA0NW2G39901&Tpk=9sia0nw2g39901; 4 pages.
NEWEGG; Motorola Behind the Neck Stereo Bluetooth Headphone Black/Red Bulk (S9)—OEM; http://www.newegg.com/Product/Product.aspx?Item=N82E16875982212&Tpk=n82e16875982212; 3 pages.
Wu et al. "Fusing Multi-Modal Features for Gesture Recognition", Proceedings of the 15$^{th}$ ACM on International Conference on Multimodal Interaction, Dec. 9, 2013, ACM, pp. 453-459.
Pitsikalis et al. "Multimodal Gesture Recognition via Multiple Hypotheses Rescoring", Journal of Machine Learning Research, Feb. 2015, pp. 255-284.
Shen et al. "Walkie-Markie: Indoor Pathway Mapping Made Easy" 10$^{th}$ USENIX Symposium on Networked Systems Design and Implementation (NSDI'13); pp. 85-98, 2013.
Tu et al. "Crowdsourced Routing II D2.6" 34 pages; 2012.
De Choudhury et al. "Automatic Construction of Travel Itineraries Using Social Breadcrumbs" pp. 35-44; Jun. 2010.
Bharathi et al.; "Effective Navigation for Visually Impaired by Wearable Obstacle Avoidance System;" *2012 International Conference on Computing, Electronics and Electrical Technologies (ICCEET)*; pp. 956-958; 2012.
Pawar et al.; "Review Paper on Multitasking Stick for Guiding Safe Path for Visually Disable People;" *IJPRET*; vol. 3, No. 9; pp. 929-936; 2015.
Ram et al.; "The People Sensor: A Mobility Aid for the Visually Impaired;" 2012 16$^{th}$ International Symposium on Wearable Computers; pp. 166-167; 2012.
Singhal; "The Development of an Intelligent Aid for Blind and Old People;" *Emerging Trends and Applications in Computer Science (ICETACS), 2013 1$^{st}$ International Conference;* pp. 182-185; Sep. 13, 2013.
Aggarwal et al.; "All-in-One Companion for Visually Impaired;" *International Journal of Computer Applications;* vol. 79, No. 14; pp. 37-40; Oct. 2013.
"Light Detector" *EveryWare Technologies;* 2 pages; Jun. 18, 2016.
Arati et al. "Object Recognition in Mobile Phone Application for Visually Impaired Users;" *IOSR Journal of Computer Engineering (IOSR-JCE)*; vol. 17, No. 1; pp. 30-33; Jan. 2015.
Yabu et al.; "Development of a Wearable Haptic Tactile Interface as an Aid for the Hearing and/or Visually Impaired;" *NTUT Education of Disabilities;* vol. 13; pp. 5-12; 2015.
Mau et al.; "BlindAid: An Electronic Travel Aid for the Blind;" *The Robotics Institute Carnegie Mellon University;* 27 pages; May 2008.
Shidujaman et al.; "Design and navigation Prospective for Wireless Power Transmission Robot;" IEEE; Jun. 2015.

\* cited by examiner

| LOCATION | HAZARD TYPE | CONFIDENCE | SEVERITY LEVEL |
|---|---|---|---|
| LOC 1 | LOW BRANCH OVER SIDEWALK | 50% | 4 |
| LOC 2 | UNCOVERED POTHOLE IN STREET | 80% | 2 |
| LOC 3 | SIDEWALK CLOSED FOR REPAIR | 100% | 5 |
| LOC 4 | LARGE GROUP OF PEOPLE | 30% | 1 |
| ... | ... | ... | ... |

FIG. 5

| | SEVERITY LEVEL FACTOR | SEVERITY LEVEL ADJUSTMENT |
|---|---|---|
| 708 ALL HAZARDS | OBJECT WITHIN 5FT —712 | +0.5 |
| | OBJECT WITHIN 10FT —714 | +0 |
| | RELATIVE DISTANCE BETWEEN OBJECT AND DEVICE DECREASING | +0.5 |
| | RELATIVE DISTANCE BETWEEN OBJECT AND DEVICE INCREASING | -1 |
| | OBJECT TURNED ON | +0.5 |
| | OBJECT TURNED OFF | -0.5 |
| | OBJECT TRAVELING DIRECTLY TOWARDS THE DEVICE | +1 |
| | ... | ... |
| 710 UNIDENTIFIED HAZARDS | SIZE > 1CU FT —726 | +0.5 |
| | SIZE > 5CU FT —728 | +1 |
| | VOLUME > 20dB | +0.5 |
| | VOLUME > 50dB | +1 |
| | SHARP OBJECT | +1 |
| | ... | ... |

| HAZARD 802 | VOLUME 804 | ESTIMATED DISTANCE 806 |
|---|---|---|
| 808 MOTORCYCLE | < 30dB ~810 | >50FT |
| | 30dB-40dB ~812 | 35FT-50FT |
| | 40dB-50dB | 25FT-35FT |
| | 50dB-60dB | 15FT-25FT |
| | 60dB-70dB | 10FT-15FT |
| | 70dB-80dB | 5FT-10FT |
| | >80dB | <5FT |
| 824 CHAINSAW | <20dB | >20FT |
| | 20dB-30dB | 15FT-20FT |
| | 30dB-40dB | 10FT-15FT |
| | 40dB-50dB | 5FT-10FT |
| | >50dB | <5FT |
| | | |
| ... | ... | ... |

FIG. 8

WEARABLE SMART DEVICE FOR HAZARD DETECTION AND WARNING BASED ON IMAGE AND AUDIO DATA

BACKGROUND

1. Field

The present disclosure relates to a wearable smart device for warning a user of a hazard based on image data and audio data.

2. Description of the Related Art

Certain individuals may be at a particular disadvantage in certain environments because of a lack of sensory capabilities, such as a blind or hearing disabled individual, and/or because of an extreme environment, such as workers in a loud factory. These individuals cannot detect certain information in their environment in the same manner as an individual having all of his senses or being in a tranquil environment. Accordingly, these individuals may not become aware of hazardous situations as they arise in their environment because of their lost or muted senses and may be at a higher risk of danger because they cannot detect the hazard in their surroundings or as the hazard approaches. Frequently, the lost or muted senses include sight and hearing.

Wearable cameras provide recording and documenting of a user's experience, often from the same or similar point of view or field of view (FOV) of the user. The experience may be recorded with a camera and/or a microphone which detect data that cannot be detected by individuals with lost or muted senses of sight and/or hearing. However, these devices are passive recorders, and do not generally provide real-time processing and information about the scene in the FOV. Therefore, the data captured by the camera and the microphone cannot be used to supplement a user's awareness of the environment.

Thus, there is a need for a wearable device that detects data corresponding to a user's environment and converts that data into feedback that can be detected by a user having muted or lost senses.

SUMMARY

What is described is a wearable smart device for providing hazard warning information. The wearable smart device includes a microphone configured to detect audio data associated with a potential hazard. The wearable smart device also includes a camera configured to detect image data associated with the potential hazard. The wearable smart device also includes a processor coupled to the microphone and the camera and configured to determine whether the potential hazard presents a real hazard based on at least one of the detected audio data or the detected image data.

Also described is a smart necklace for providing hazard warnings. The smart necklace includes an upper portion having a first end and a second end. The smart necklace also includes a first lower portion coupled to the first end of the upper portion. The smart necklace also includes a second lower portion coupled to the second end of the upper portion. The smart necklace also includes at least one microphone positioned on the first lower portion, the second lower portion or the upper portion and configured to detect audio data associated with a potential hazard. The smart necklace also includes a camera positioned on the first lower portion or the second lower portion and configured to detect image data associated with the potential hazard. The smart necklace also includes a processor coupled to the camera and the at least one microphone and configured to determine whether the potential hazard presents a real hazard based on the detected audio data and the detected image data.

Also described is a method for providing hazard warnings to a user of a wearable smart device. The method includes detecting, by at least two microphones, audio data associated with a potential hazard and including volume information. The method also includes detecting, by a camera, image data associated with the potential hazard. The method also includes determining, by a processor, whether the potential hazard presents a real hazard based on the detected audio data and the detected image data.

Also described is a method for providing hazard warnings to a user of a wearable smart device. The method includes storing, in a memory, a location of a hazard. The method also includes detecting, by at least two of a GPS, an IMU, a camera or a microphone, location data. The method also includes determining, by a processor, a current location of the wearable smart device. The method also includes determining, by the processor, that the current location is within a predetermined distance of the location of the hazard. The method also includes determining, by the processor, feedback data to be provided to the user in response to the current location being within the predetermined distance of the location of the hazard.

BRIEF DESCRIPTION OF THE DRAWINGS

Other systems, methods, features, and advantages of the present invention will be or will become apparent to one of ordinary skill in the art upon examination of the following figures and detailed description. It is intended that all such additional systems, methods, features, and advantages be included within this description, be within the scope of the present invention, and be protected by the accompanying claims. Component parts shown in the drawings are not necessarily to scale, and may be exaggerated to better illustrate the important features of the present invention. In the drawings, like reference numerals designate like parts throughout the different views, wherein:

FIG. 5 illustrates an exemplary database for storing various hazard information associated with particular locations, including confidence values associated with the hazards and severity levels associated with the hazards according to an embodiment of the present invention;

FIG. 7 illustrates an exemplary database that associates various severity level factors with corresponding adjustments to the severity level according to an embodiment of the present invention;

FIG. 8 illustrates an exemplary database that associates detected volumes of known hazards with an estimated distance to a hazard according to an embodiment of the present invention;

DETAILED DESCRIPTION

Figure 1:
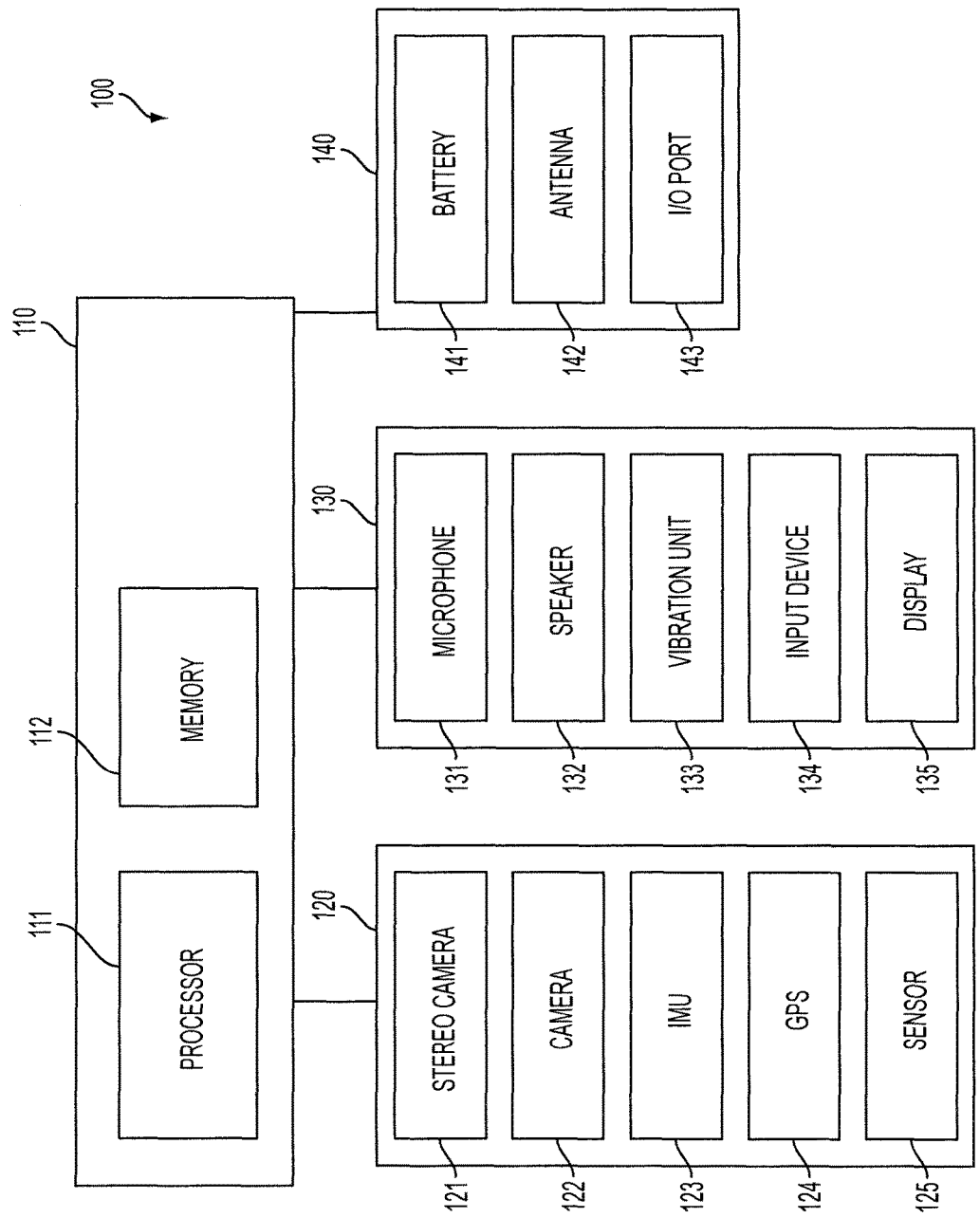
FIG. 1 is a block diagram of a wearable smart device according to an embodiment of the present invention.

The wearable smart devices and methods described herein detect data that correspond to an environment of a user, determine when a hazard is present in the environment and provide feedback that the user can use to avoid or take action regarding the hazard. The wearable smart devices can be used by users that are visually and/or hearing impaired. In addition, the wearable smart devices can be used by users that work in extreme or difficult environments such as a loud factory, a workplace with dim lighting or visibility, a crowded workplace, a construction site, etc. Each hazard may also be assigned to a severity level and a confidence level. The severity level corresponds to a likelihood of danger presented by the hazard, the degree of danger presented by the hazard, the proximity of the hazard to the user or the like. The confidence level is an estimated confidence that the hazard still exists at the location.

The data corresponding to the environment may include both image data and audio data which can supplement a user's muted or lost senses of sight and/or hearing. The wearable smart devices and methods provide several benefits and advantages such as an increased robustness and accuracy of detection of potential hazards in a user's environment (including when one sensor is incapable of detecting the hazard), an ability to determine a severity level and/or a confidence level of each hazard and an ability to determine whether an unidentified situation or object presents a hazard. The wearable devices and methods provide additional benefits and advantages including an ability to determine a distance to a hazard and an ability to determine a direction to a hazard.

An exemplary wearable smart device includes both a microphone and a camera capable of detecting audio and image data corresponding to the user's environment. The microphone may include more than one microphone capable of detecting stereo audio data so that a direction and/or a distance to the hazard can be detected. The camera may include a stereo camera pair so that a direction and/or a distance to the hazard can be detected. The wearable smart device may also include a GPS and/or an IMU which, when working in tandem with the camera and/or microphone, can be used to detect highly accurate location data corresponding to a location of the user.

The wearable smart device may also include a memory for storing multiple databases corresponding hazard information to location data, audio data and image data. The memory may also include a database that associates detected factors to an adjustment in a severity level of a hazard and a database for corresponding volumes of identified audio sounds with distance information. The wearable smart device also includes a processor capable of comparing the detected audio and image data to the databases to match the hazard data to detected image data, audio data and location data. The processor may also be capable of determining a severity of the detected hazard.

In one implementation and with reference to FIG. 1, a wearable smart device 100 includes an onboard processing array 110 which communicates with a sensor array 120, an interface array 130 and a component array 140. The onboard processing array 110, the sensor array 120, the interface array 130 and the component array 140 are exemplary groupings to visually organize the components of the wearable smart device 100 in the block diagram of FIG. 1 and are not limiting or necessarily representative of any physical groupings. In addition, certain implementations may have more or less components than illustrated in FIG. 1.

The onboard processing array 110 includes a processor 111 and a memory 112. The processor 111 may be a computer processor such as an ARM processor, DSP processor, distributed processor or other form of central processing. The processor 111 may be positioned on the wearable smart device 100, may be a remote processor or it may be a pairing of a local and a remote processor.

The memory 112 may be one or any combination of the following: a RAM or other volatile or nonvolatile memory, a non-transitory memory or a data storage device, such as a hard disk drive, a solid state disk drive, a hybrid disk drive or other appropriate data storage. The memory 112 may further store machine-readable instructions which may be loaded into the memory 112 and executed by the processor 111. As with the processor 111, the memory 112 may be positioned on the wearable smart device 100, may be positioned remote from the wearable smart device 100 or may be a pairing of a local and a remote memory.

The sensor array 120 includes stereo cameras 121, a camera 122, an inertial measurement unit (IMU) 123, a global positioning system (GPS) 124 and a sensor 125. The stereo cameras 121 may be a stereo camera pair comprising two cameras offset by a stereo distance. The stereo distance may be optimized for the two cameras. The wearable smart device 100 may have more than one pair of stereo cameras 121. The camera 122 may be a camera or other optical sensor not part of a stereo camera pair. In some embodiments, the camera 122 may be positioned on an opposite side of the wearable smart device 100 from the pair of stereo cameras 121 and/or may be placed where needed, such as behind the user's neck to provide data for an area behind the user.

In some embodiments, the processor 111 may be capable of changing the focus of the stereo cameras 121 and/or the camera 122. This may include instructing an actuator coupled to the stereo cameras 121 and/or the camera 122 to rotate, turn, etc. in order to change the FOV. The processor 111 may also be capable of changing a focus point of the stereo cameras 121 and/or the camera 122 in order to detect image data at a particular distance from the wearable smart device 100.

The IMU 123 may be an IMU which may further comprise one or more of an accelerometer, a gyroscope, a magnetometer or the like. The GPS 124 may be one or more GPS units. The sensor 125 may be one or more sensors which provide further information about the environment in conjunction with the rest of the sensor array 120. The sensor 125 may be one or more of a camera, a temperature sensor, an air pressure sensor, a moisture or humidity sensor, a gas detector or other chemical sensor, a sound sensor, a pH sensor, a smoke detector, a metal detector, an actinometer, an altimeter, a depth gauge, a compass, a radiation sensor, a motion detector, a light sensor or other sensor.

The interface array 130 includes a microphone 131, a speaker 132, a vibration unit 133, an input device 134 and a display 135. The microphone 131 may be a microphone or other device capable of detecting sounds, such as voice activation/commands or other voice actions from the user, and may be integrated with or external to the wearable smart device 100. In some embodiments, the microphone 131 may include multiple microphones capable of detecting audio data of an environment of the wearable smart device 100. Additionally, the microphone 131 may be capable of detecting a volume of a particular sound. The microphones 131 may be separated by a distance such that data detected by the microphones 131 may be used to determine the distance to the source of a sound and the direction of the source of the sound.

The speaker 132 may be one or more speakers or other devices capable of producing sounds and/or vibrations. The vibration unit 133 may be a vibration motor or actuator capable of providing haptic and tactile output. In certain implementations, the vibration unit 133 may also be capable of producing sounds, such that the speaker 132 and the vibration unit 133 may be the same or integrated.

The vibration unit 133 may include a left vibration motor in a left portion of the wearable smart device 100 and a right vibration motor in a right portion of the wearable smart device 100 for providing stereo haptic feedback to the user. Vibration patterns on the left portion can be different than vibration patterns on the right portion. In this manner, different combination of left/right vibration patterns can convey more varieties of useful information to the user (as opposed to outputting the same pattern in both left and right vibration). For example, certain vibration patterns on the left that are lacking on the right may be used to signal to the user that the user should turn left. This advantageously allows various combinations of haptic feedback using a left-side vibration that may differ from a right-side vibration.

The input device 134 may be an input device such as a touch sensor and/or one or more buttons. For example, the input device 134 may be a plurality of buttons, such that each button corresponds to a different activity of the wearable smart device 100. In various embodiments, the microphone 131 may be considered an input device, such that the term "input device" may refer to the microphone, a button or buttons, a touchpad, a touchscreen or the like.

The display 135 may be a display integrated into the wearable smart device 100 or wirelessly connected to the wearable smart device 100. The display 135 may be capable of displaying visual data from the stereo cameras 121 and/or the camera 122. In other implementations, the display 135 may be another visual alert device, such as one or more LEDs or similar light source. In various embodiments, the input device 134 and the display 135 may be the same or integrated, such as a touchscreen.

The component array 140 includes a battery 141, an antenna 142 and an input/output port (I/O port) 143. The battery 141 may be a battery or other power supply capable of powering the wearable smart device 100. The battery 141 may have a connection port for recharging or may be wirelessly recharged, such as through induction charging. The antenna 142 may be one or more antennas capable of transmitting and receiving wireless communications. For example, the antenna 142 may be a Bluetooth or WiFi antenna, may be a radio frequency identification (RFID) antenna or reader and/or a near field communication (NFC) unit. The I/O port 143 may be one or more ports for connecting additional peripherals. For example, the I/O port 143 may be a headphone jack, a data port or the like.

The antenna 142 and/or the I/O port 143 allows the wearable smart device 100 to connect to another device or network for data downloads, such as updates to the smart necklace, map information or other relevant information for a particular application, and data uploads, such as status updates and updated map information. Further, the antenna 142 and/or the I/O port 143 allows the wearable smart device 100 to communicate with other wearable smart devices for distributed computing or sharing resources.

The wearable smart device 100 described herein is generally a stand-alone device. However, in other implementations, the wearable smart device 100 may be configured or optimized to work in conjunction with other devices. For example, smartphones, tablets or other mobile devices may wirelessly connect to the wearable smart device 100 for shared resources and processing. The mobile device may act as a display unit for the wearable smart device 100. The wearable smart device 100 may further have specific protocols for interacting with mobile devices or other smart necklaces. Additionally, the wearable smart device 100 may connect over the internet to remote processing and/or remote storage, such as a cloud.

The wearable smart device 100 includes one or more features allowing the wearable smart device 100 to be worn by a user. In some embodiments, the wearable smart device 100 may be implemented as a necklace, an earpiece, eyeglasses, a smart watch, a smart clip or the like. The necklace may drape over a user's neck or shoulders, eyeglasses may rest on a user's nose and/or ears, the smart watch may be worn around a user's neck or wrist, the smart clip may be clipped onto the user or an article of clothing of the user, etc. The wearable smart device 100 is capable of recognizing objects around the user in order to alert the user. For example, the wearable smart device 100 may be used by a blind person to aid in environmental awareness and warning of dangerous situations. The wearable smart device 100 provides the user audio and/or haptic feedback through the speaker 132 and/or the vibration unit 133 based upon inputs including image data from the stereo cameras 121, image data from the camera 122 and/or audio data from the microphone 131.

The memory 112 may store map information or data to help locate hazards and provide hazard alerts to the user. The map data may be preloaded, downloaded wirelessly through the antenna 142, or may be visually determined, such as by capturing a building map posted near a building's entrance or built from previous encounters and recordings. The map data may be abstract, such as a network diagram with edges, or a series of coordinates with features. The map data may contain points of interest to the user and, as the user changes location, the stereo cameras 121 and/or cameras 122 may passively recognize additional points of interest and update the map data. In some embodiments, map data may be updated with audio information. For example, a factory may always output the same noise at the same frequency and volume. The wearable smart device 100 may update the map with audio data associated with the location and including the frequency and volume of the noise.

In certain locations such as indoor locations, the stand-alone GPS unit may not provide enough information to determine a very accurate location of the user. The wearable smart device 100 may use data detected from the stereo cameras 121, the camera 122, the IMU 123, the GPS 124, the sensor 125, the microphone 131 and/or the antenna 142 to determine an accurate location of the wearable smart device 100. The wearable smart device 100 may recognize, for instance, stairs, exits, and restrooms and appropriately store their location in the memory 112. Other stored location data or other data may include potential hazards, descriptions of surrounding structures, alternate routes and other locations. Additional data and points of interest can be downloaded and/or uploaded to mobile devices and other devices, social networks, or the cloud through Bluetooth or other wireless networks.

Figure 2:
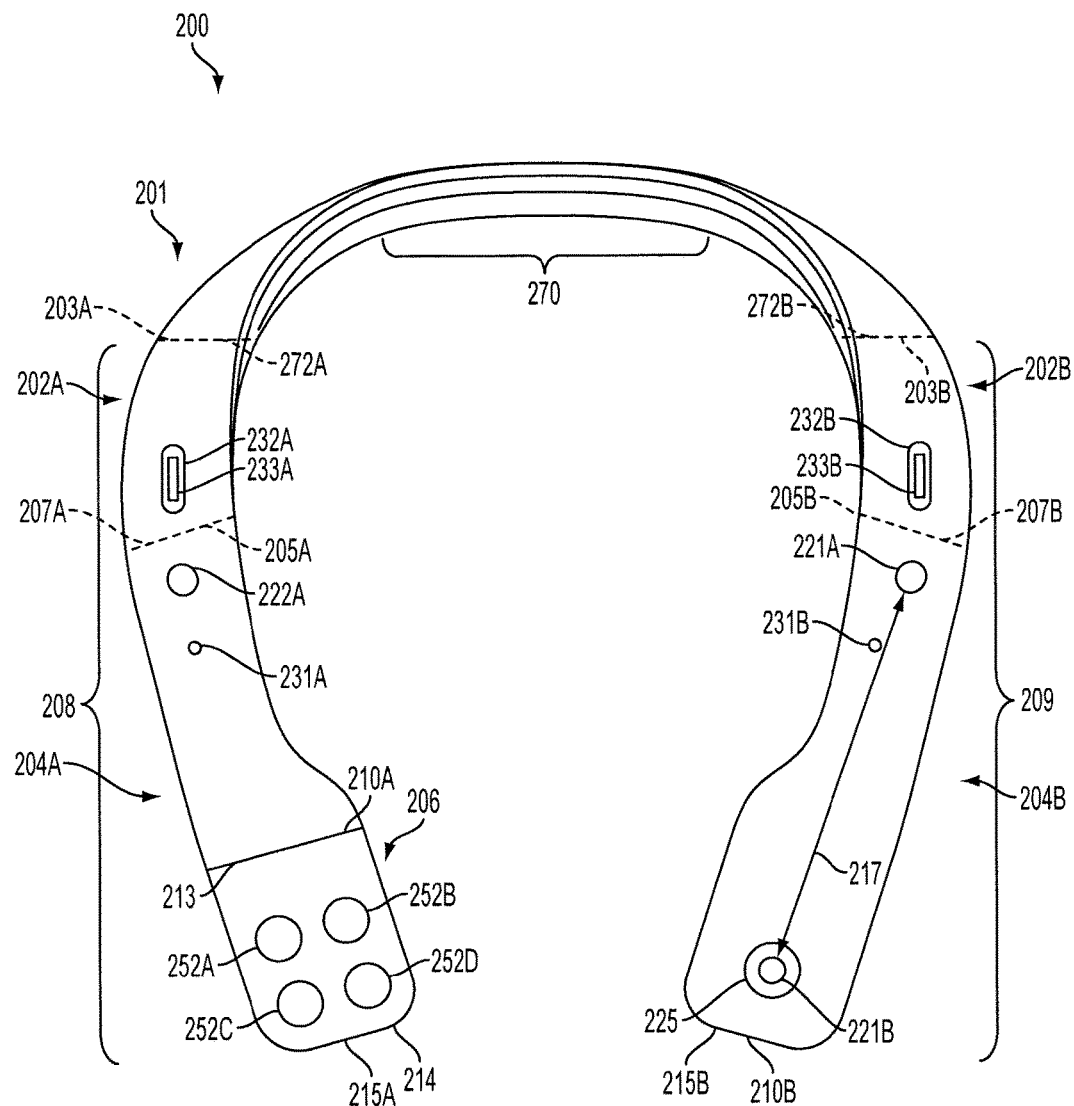
FIG. 2 illustrates a front view of a smart necklace according to an embodiment of the present invention.

FIG. 2 illustrates an embodiment of a smart necklace 200 (or blind aid necklace) viewed from the front (i.e., along the Z axis). An XYZ axis is shown to illustrate the shape and relative position of components within the smart necklace 200. The wearable smart device illustrated in FIG. 2 is one embodiment of a wearable smart device. One skilled in the art will realize that a wearable smart device can have other shapes and configurations.

The smart necklace 200 includes an upper portion 201, a right portion 208 and a left portion 209. The smart necklace 200 is to be worn around a neck of a user. When worn, the upper portion 201 may rest on the back of a person's neck. The right portion 208 may extend over the user's right shoulder such that a right end 215A of the smart necklace 200 is positioned on or above the user's right chest. Similarly, the left portion 209 may extend over the user's left shoulder such that a left end 215B of the smart necklace 200 is positioned on or above the left side of the user's chest.

The right portion 208 may include a right middle portion 202A, a lower right portion 204A, and a button portion 206. In some embodiments, the right portion 208 may not be separated into the right middle portion 202A, the lower right portion 204A and/or the button portion 206.

The upper portion may have a middle 270, a left end 272B and a right end 272A. The upper portion 201 may be substantially straight at the middle 270 and curved between the middle 270 and the ends 272 such that the middle and lower portions may extend over the user's shoulder. The curve towards the left end 272B and the right end 272A may be such that the curves substantially mimic the user's neck and shoulders. This design allows the upper portion 201 to rest comfortably on the user's neck. The upper portion 201 may be rigid, meaning that the upper portion 201 will not bend or flex under normal pressure. This allows sensitive components such as batteries, processors, memories or the like to be housed in the upper portion 201 without concern of the components becoming damaged. The upper portion 201 may be at least partially hollow such that components may be housed within the upper portion 201.

Herein, if a component is positioned on a portion of the smart necklace, then the component may be internal with reference to the portion, the component may be partially internal and partially external with reference to the portion or the component may be external to and coupled to the portion.

The right middle portion 202A includes an upper end 203A coupled to the right end 272A of the upper portion 201 and a lower end 205A. The left middle portion 202B includes an upper end 203B coupled to the left end 272B of the upper portion 201 and a lower end 205B. The middle portions 202 may be permanently coupled to the upper portion 201 or they may be removably coupled to the upper portion 201. When portions of the smart necklace 200 are removably coupled together, the connection may be such that the portions will not detach under normal wearing conditions.

The middle portions 202 may be curved. This allows the middle portions 202 to rest against the user's neck and/or shoulders. In some embodiments, the middle portions 202 may be constructed of a semi-rigid material, such as rubber, silicone or the like. The semi-rigid material may bend or flex under certain forces but will return to its original shape when the force has been removed. The semi rigid material may allow the middle portions 202 to conform to the contours of a user's shoulders. Thus, the semi rigid material of the middle portions 202 allows the smart necklace 200 to comfortably fit different users.

The right middle portion 202A may include a speaker 232A and a vibration unit 233A. The left middle portion 202B similarly may include a speaker 232B and a vibration unit 233B. By providing a speaker and/or a vibration unit on both sides of the user, stereo information can be provided to the user. For example, a vibration by vibration unit 233A may indicate that the user is to turn right and a vibration by vibration unit 233B may indicate that the user is to turn left. Alternatively, a vibration on vibration unit 233A may instead indicate that the user is traveling too far to the user's right and should therefore turn left and a vibration by vibration unit 233B may indicate that the user should turn right.

The lower right portion 204A includes an upper end 207A coupled to the lower end 205A of the right middle portion 202A and a lower end 210A. The lower right portion 204A may be permanently coupled to the right middle portion 202A or may be removably coupled to the right middle portion 202A.

The lower right portion 204A may be substantially straight. Proximal to the right end 215A, the lower right portion 204A may become larger in the X direction. This provides additional surface area for components, such as buttons, to be positioned towards the right end 215A of the smart necklace. The lower right portion 204A may be constructed of a rigid material. The rigid material may be at least partially hollow or contain a cavity such that components may be housed within the lower right portion 204A.

The lower right portion 204A may include a camera 222A and a microphone 231A. The camera 222A may be a single camera capable of detecting image data of any light spectrum including, but not limited to, the visible light spectrum, the infrared spectrum, the near ultraviolet spectrum, etc. The microphone 231A may be adapted to detect audio information. For example, the microphone 231A may detect speech of a user, speech of another person, audio data associated with an environment of the user or the like. Additionally, the microphone 231A may be adapted to detect sounds of various frequencies and/or detect volumes.

The lower left portion 204B includes an upper end 207B coupled to the lower end 205B of the left middle portion 202B and a lower end 210B that is the same as the left end 215B of the smart necklace 200. The lower left portion 204B may be permanently coupled to the left middle portion 202B or may be removably coupled to the left middle portion 202B.

The lower left portion 204B may be similar to the lower right portion 204A. The lower left portion 204B may become larger in the X direction as it approaches the left end 215B. This may provide a greater surface area for additional externally-mounted components and/or a greater volume for housing internal components. The lower left portion 204B may be constructed of a rigid material and be at least partially hollow such that components may be housed within the lower left portion 204B.

The lower left portion 204B may include a pair of stereo cameras 221. A stereo camera 221A may be positioned proximal to the left middle portion 202B while another stereo camera 221B is positioned proximal to the left end 215B. The pair of stereo cameras 221 may be separated from each other by a distance 217. The distance 217 may be selected based upon an optimal range. For example, if it is determined that depth information is most important between 5 and 10 feet, the distance 217 may be smaller than if depth information were most important between 10 and 15 feet.

The stereo camera 221A and/or the stereo camera 221B may be wide angle cameras such that they can detect image data at a range of about 120 degrees. The stereo cameras 221 may be capable of detecting image data at various light spectrums, including, but not limited to, the visible light spectrum, the infrared spectrum, the near ultraviolet spectrum, etc.

The lower left portion 204B may also include a light sensor 225. In various embodiments, a single device may comprise the light sensor 225 and the stereo camera 221B. In various embodiments, the lower left portion 204B includes a cavity such that both the light sensor 225 and the stereo camera 221B are positioned within the same cavity. In various embodiments, the light sensor 225 and the stereo camera 221B may be positioned at separate locations on the smart necklace 200. In various embodiments, the light sensor 225 is coupled to each camera and stereo camera of the wearable smart device 100. Coupling between the cameras and the light sensor 225 may allow each camera to adjust its sensitivity to light based on an ambient amount of light sensed by the light sensor 225 such that each camera may detect an optimal quality of image data. In various embodiments, the processor may be coupled to the light sensor 225 such that the processor may adjust image data received from the cameras based on the detected ambient light.

The lower left portion 204B may also include a microphone 231B. The microphone 231B may be adapted to detect audio information. For example, the microphone 231B may detect speech of a user, speech of another person, audio data associated with an environment of the user and noises from the environment. Additionally, the microphone 231B may be adapted to detect various frequencies and/or detect volume. The microphone 231A and the microphone 231B are spaced apart from each other so that data received from the microphone 231A and the microphone 231B may be used to determine a direction and/or a distance to a source of a sound. The microphones may be spaced apart by any distance between half of an inch and 12 inches. This information may be used to assist in warning or other functions of the smart necklace 200.

Between the lower right portion 204A and the right end 215A may be a button portion 206. The button portion 206 has an upper end 213 coupled to the lower end 210A of the lower right portion 204A and a lower end 214 that is the same as the right end 215A of the smart necklace 200.

The lower right portion 204A may be permanently coupled to the button portion 206 or may be removably coupled to the button portion 206. In various embodiments, the lower right portion 204A and the button portion 206 are a single portion and/or the button portion 206 may simply be an extension of the lower right portion 204A. In various embodiments, the button portion 206 is removable such that a new or updated button portion may be attached to the smart necklace 200. In this manner, functionality may be added to the smart necklace 200 by inclusion of the new button portion. The button portion 206 may be at least partially hollow and constructed of a rigid material and the button portion may house components. The button portion 206 may include at least one button or other input device 252. The input device 252 may be used by a user to select modes of operation of the smart necklace 200, to change settings of the smart necklace 200 or the like.

Figure 3:
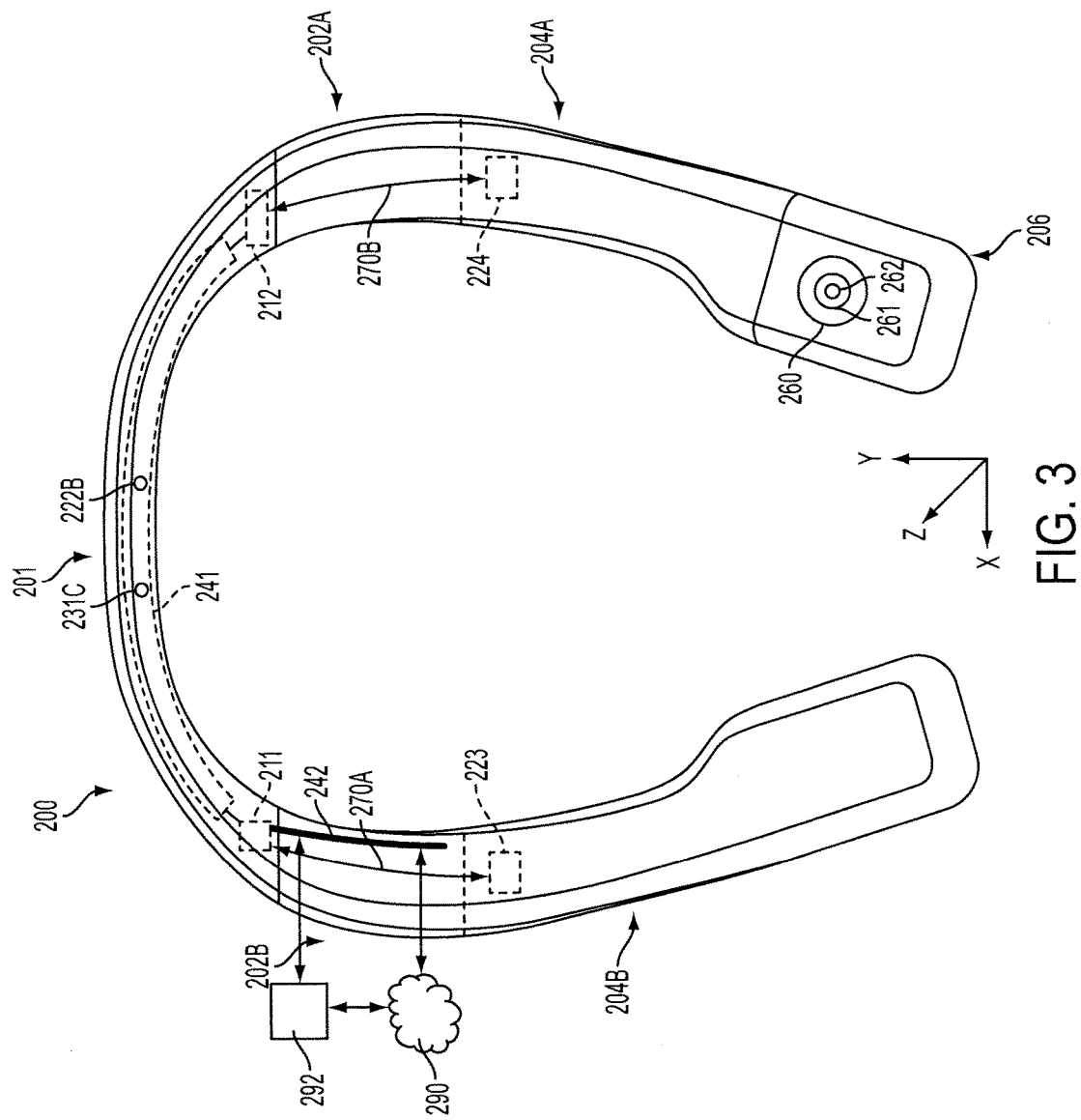
FIG. 3 illustrates a rear view of the smart necklace of FIG. 2 according to an embodiment of the present invention.

FIG. 3 illustrates the smart necklace 200 of FIG. 2 from the back or rear (i.e., along the Z axis). In FIG. 3, the smart necklace 200 is illustrated from the opposite side of the Z axis than illustrated in FIG. 2.

The upper portion 201 of the smart necklace may include a battery 241. In various embodiments, the battery 241 may be centered within the upper portion 201 on the X axis. The battery 241 may be coupled to all of the electronic devices within the smart necklace 200 so that the battery can provide power to all electrical components within the smart necklace 200.

The upper portion 201 may also include a processor 211. The processor 211 may be coupled to all electronic components of the smart necklace 200 and adapted to receive inputs and provide outputs from/to the electronic components. The processor 211 may be adapted to determine hazard data based on inputs received from the stereo cameras 221, the cameras 222, the microphones 231, the IMU 223, the GPS 124 and/or the light sensor 225.

The upper portion 201 may also include a memory 212. The memory 212 may be coupled to the processor 211 such that the processor 211 can store and retrieve data from the memory 212. The memory 212 and the processor 211 may be positioned on the same side or on opposite sides of the upper portion 201. It is preferred that weight distribution of the upper portion 201 is centered in the middle of the upper portion 201 along the X direction. This will cause the weight of the upper portion 201 to be evenly distributed on the user, increasing the comfort of the smart necklace 200.

The upper portion 201 may include a camera 222B and a microphone 231C. The camera 222B may be a single camera capable of detecting image data of any light spectrum including, but not limited to, the visible light spectrum, the infrared spectrum, the near ultraviolet spectrum, etc. The camera 222B may be adapted to detect image data behind a user. The microphone 231C may be adapted to detect audio information. For example, the microphone 231C may detect speech of a user, speech of another person, audio data associated with an environment of the user and noises from the environment. Additionally, the microphone 231C may be adapted to detect various frequencies and volumes. Data received from the microphone 231C may be used in conjunction with data received from the microphone 231A and the microphone 231B to determine a direction and/or a distance to a source of a sound. The microphone 231C may be adapted to better detect audio data originating from behind the smart necklace 200.

The lower left portion 204B may include an IMU 223 that is similar to the IMU 123. The lower right portion 204A may include a GPS 224 that is similar to the GPS 124.

The lower left portion 204B may include an indent 260, a connector 261 and a charging contact 262. In various embodiments, the charging contact 262 may be positioned within the indent 260. The charging contact 262 may be coupled to the battery 241 such that the charging contact 262 receives power and transfers that power to the battery 241 for storage. The charging contact 262 may be adapted to receive power via magnetic charging, inductive charging, direct charging or the like. In various embodiments, the charging contact 262 may be coupled to the processor 211 such that electronic data may be transferred via the charging contact 262 in addition to or instead of power.

The middle portions 202 may or may not include additional components than those illustrated in FIG. 2. If no additional components are present in the middle portions 202, a connection 270A and a connection 270B may exist within the middle portions 202 in order to electrically couple the lower portions 204 to the upper portion 201. The connections 270 may include a data bus, a power line, or any other electrical connection. In some embodiments, the connections 270 may be replaced with wireless connectivity between the lower portions 204 and the upper portion 201.

The smart necklace 200 may have an antenna 242 extend into the left middle portion 202B. The antenna 242 may be coupled to the processor 211 such that the processor 211 may transmit and receive wireless signals via the antenna 242.

The antenna 242 may be wirelessly coupled to a device or devices remote from the smart necklace 200, such as a cloud 290, a mobile device 292, a laptop, a tablet or the like. In various embodiments, the cloud 290 may include storage and/or processing that the smart necklace 200 may utilize. For example, the smart necklace 200 may transmit certain data to the cloud 290 such that the cloud stores the data or processes the data. The smart necklace 200 may later retrieve the stored and/or processed data from the cloud 290. In various embodiments, the smart necklace 200 is designed to perform some functions locally, such as by the processor 211, and is designed such that other functions are performed remotely, such as by the cloud 290.

The mobile device 292 may be coupled to the smart necklace 200 such that the mobile device 292 may perform some processing and storage functions for the smart necklace 200. The mobile device 292 may also be connected to the cloud 290 such that the mobile device 292 may perform some storage and/or processing functions and transmit additional storage and/or processing functions to the cloud 290. In various embodiments, processing and/or storage may be performed by any combination of the smart necklace 200, the mobile device 292 and the cloud 290.

Use of a smart necklace, such as the smart necklace 200, may be advantageous over other wearable smart devices. A smart necklace is generally positioned near a user's head, where the user would normally detect audio and image data. Additionally, most individuals have better sensing capabilities near their head. Thus, audio and haptic feedback provided by the smart necklace will be more easily detected by the user from an area near the head. Lastly, because the smart necklace loops around the user's neck and is positioned on their shoulders, the likelihood of the smart necklace accidentally becoming removed from the individual is reduced.

Figure 4:
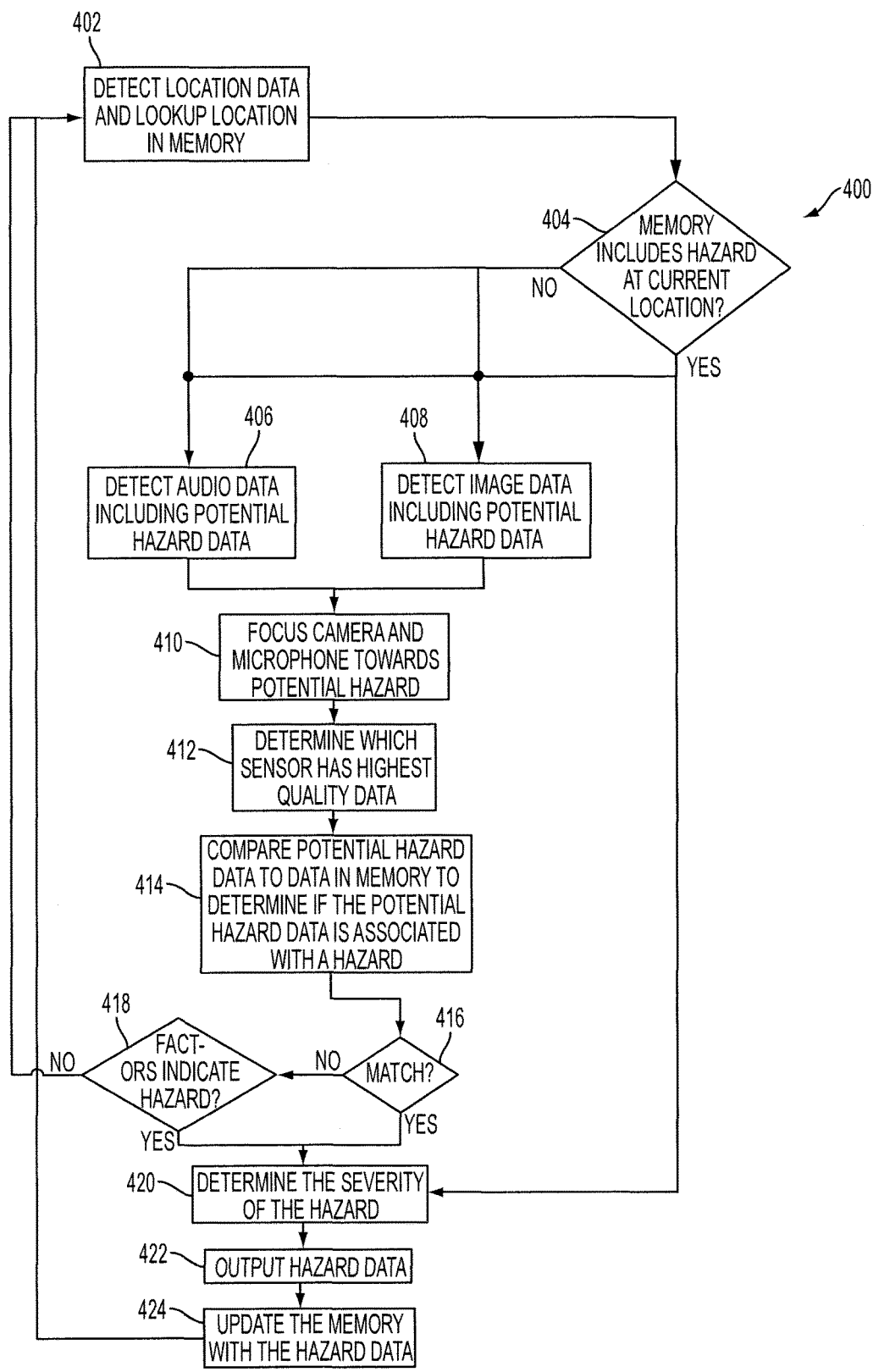
FIG. 4 illustrates an exemplary method to be performed by a wearable smart device for safety monitoring and alerting a user of a hazard according to an embodiment of the present invention.

FIG. 4 illustrates an exemplary method 400 that may be performed by a wearable smart device, such as the wearable smart device 100 or the smart necklace 200, for safety monitoring and alerting of a user of a hazard. The method 400 begins at block 402 with the wearable smart device 100 detecting location data for the current location of the wearable smart device 100 and performing a lookup for hazard data associated with the current location in the memory 112. The current location of the wearable smart device 100 may be determined based on data detected by the sensor array 120 and/or the microphone 131. In some embodiments, the processor 111 may use data detected by the GPS 124 to determine an approximate location of the wearable smart device 100. Data received by the stereo camera 121, the camera 122, the sensor 125 and/or the microphone 131 may be used to supplement or replace data detected by the GPS 124. As the wearable smart device 100 moves, the IMU 123 may detect motion. This detected motion may then be used by the processor 111 to update the current location of the wearable smart device 100. This allows the wearable smart device 100 to determine the current location accurately, such as within 1 foot, within 5 feet or within 10 feet.

A database coupled to the processor 111 may include location information and hazard information associated with a plurality of locations. The processor 111 may compare the detected current location of the wearable smart device 100 to the database to determine if potential hazards exist at or within a predetermined distance of the current location of the wearable smart device 100. The database may be a local database, a remote database or a combination. In some embodiments, the wearable smart device 100 stores a local database which is supplemented by a remote database. For example, when the wearable smart device 100 is connected to a network, the wearable smart device 100 may download a database from a remote device, including hazard and location information, and store the database in the memory 112. The wearable smart device 100 may retrieve updated database information every time it is connected to the network, periodically or the like.

In block 404, the processor 111 may determine whether hazard information is associated with the current location of the wearable smart device 100 or within the predetermined distance from the wearable smart device 100. If the memory 112 does not include hazard information within the predetermined distance of the wearable smart device 100, then the method 400 precedes to block 406 and block 408.

In block 406, audio data is detected by the microphone 131. This audio data may include speech data and noise data associated with particular objects or things in the environment of the wearable smart device 100. Any audio data detected by the microphone 131 may potentially be associated with a hazard. Accordingly, the audio data may be compared to data in the memory 112 to determine if it is associated with a hazard. For example, the detected audio data may correspond to the sound of a vehicle, the sound of a chainsaw, the sound of a group of people or the like.

In a loud factory setting, an individual may not be capable of hearing a hazard approaching over the ambient noise. The processor 111 may be capable of filtering out the ambient noise to determine any potential hazard audio data, and provide feedback to the user based on the audio data. In some embodiments, the processor 111 may be capable of detecting ambient noise and filtering out the potential hazard audio data based on previously detected ambient noise. In some embodiments, the processor 111 may include low pass, band pass, high pass filters and/or the like and determine which filter(s) to apply based on detected ambient noise and/or the filter(s) may be predetermined based on frequency patterns of common hazards and ambient noises.

In block 408, image data is detected by the stereo camera 121 and/or the camera 122. In some embodiments, the image data may be detected in all directions from the wearable smart device 100 or may be detected within one or more predetermined areas of the wearable smart device 100. The image data detected in block 408 may include potential hazard data in the same way as the audio data in block 406. The processor 111 may be capable of filtering image data in a similar fashion as the audio data.

In block 410, the stereo camera 121, the camera 122 and/or the microphone 131 may be directed and/or focused towards any potential hazard data. The processor 111 may determine the location of the potential hazard based on the audio data and/or the image data and cause the sensors to focus at that location. For example, the microphone 131 may detect audio data that corresponds to a potential hazard. As the microphone 131 may include more than one microphone, the direction of the source of the audio data may be determined based on data detected by the microphone 131. In response, the stereo cameras 121 and/or the camera 122 may be focused in the direction of the audio data. In some embodiments, the microphone 131 may also become focused in the direction of the source of the audio data. In some embodiments, the camera 122 and/or the stereo cameras 121 may initially detect potential hazard data and the microphone 131 may be focused towards the image data.

In block 412, the processor 111 may determine which sensor detected the highest quality data between the microphone 131, the stereo camera 121, the camera 122 and/or the sensor 125. High quality may be associated with the lack of obstruction of the data (e.g., an object in the path between the stereo cameras 121 and the source of the data), the most accurate data (i.e., the stereo cameras 121 may be selected over the camera 122 because depth information can be determined by the stereo cameras 121), that one type of data matches objects in the memory 112 (i.e., a match is found that corresponds to the audio data but not the image data), or the like. The highest quality data may be the only data used by the processor 111, the highest quality data may be given more weight than lower quality data or all data may be given equal weight.

In block 414, the potential hazard data is compared to data in the memory 112 to determine if the potential hazard data is associated with a hazard. The comparison may be done in a variety of manners. The memory 112 may store image and/or audio data associated with various hazards. In some embodiments, the processor 111 may compare detected image and/or audio data to hazard data in the memory to determine if a match occurs. In some embodiments, the processor 111 may compare image data and/or audio data to data associated with the location in the memory 112 to determine if a divergence exists between the currently detected data and the previously stored data. The divergence method will be explained in more detail below with reference to FIGS. 11 and 12.

In block 416, the processor 111 determines whether the detected data from the microphone 131, the stereo cameras 121 and/or the camera 122 matches hazard data in the memory 112.

If a match is found in block 416, the processor 111 may determine the severity of the hazard in block 420. The severity may correspond to a likelihood of danger presented by the hazard, the degree of danger presented by the hazard, the proximity of the hazard to the wearable smart device 100 or the like. Each hazard may be associated with a severity rating. For example, a vehicle traveling directly at the wearable smart device 100 may have a higher severity rating than a pothole in the road that is not in a direction of travel of the wearable smart device 100. Severity ratings will be described below with reference to FIGS. 5-7.

If no match is found in block 416, then the processor 111 may determine whether factors indicate that a hazard is present in block 418. The factors may be any indication that the potential hazard is or is not a hazard. The processor 111 may compare detected data to data stored in the memory to determine if the factors indicate a hazard. If a certain number and type of factors are met, the processor 111 may determine that the potential hazard data indicates a hazard. The factors may include adjustments to severity levels. If the severity reaches a predetermined severity level, the processor 111 may determine that the potential hazard data indicates a hazard. If the factors do not indicate that a hazard is present in block 418, then the method 400 returns to block 402 where location data is detected and compared to a database in the memory 112.

If factors do indicate a hazard, the method 400 may proceed to block 420 in which the processor 111 determines the severity level of the hazard. In some embodiments, the severity level may be determined by comparing detected data to factors. Some of the factors indicate a lack of a hazard and some may indicate the presence of a hazard. Thus, it is possible for a match to be found in block 416 and the processor 111 to determine that no hazard is present.

In block 422, hazard data may be provided to a user of the wearable smart device 100 as feedback. The feedback may be provided via the speaker 132, the vibration unit 133 and/or the display 135. The data may be speech data, vibration data or image data describing/identifying the hazard and/or indicating the location of the hazard. In some embodiments, the data may be provided by the speaker 132, the vibration unit 133 and/or the display 135 that provides navigation instructions around the hazard. The speaker 132 may provide speech data directing the user around the hazard and/or the speaker 132 and/or the vibration unit 133 may provide particular tones and/or vibrations on either side of the wearable smart device 100 indicating instructions for the user to navigate around the hazard. For example, a left vibration unit may vibrate indicating that the user should move to the left in order to avoid the hazard. In some embodiments, a right vibration unit may vibrate indicating that the user should avoid moving to the right and should move left in order to avoid the hazard.

Additionally, vibrations can be used to indicate the presence of a hazard to a user. This is particularly helpful when the user is hearing impaired or working in a dangerous and loud environment. These types of users may not hear audible feedback, so the haptic feedback may be the only feedback they can receive. Additionally, for these users, inclusion of detected audio data in the hazard determination is even more important than for other users. Hearing impaired individuals and individuals in loud environments may not hear a hazard approaching. Thus, the wearable smart device 100 may act as their ears by detecting audio data and converting the audio data into haptic feedback.

In some embodiments, the wearable smart device 100 may be adapted to determine whether audio and/or haptic feedback should be provided. The processor 111 may determine a volume of the surrounding environment based on audio data detected by the microphone 131. If the detected volume is above a certain level, the processor 111 may determine that vibratory feedback is preferred, as the likelihood of a user hearing audio feedback may be low. This is extremely useful for certain users, such as workers in a factory, as they may prefer audio feedback in quieter environments and haptic feedback in louder environments.

In some embodiments, the wearable smart device 100 may only provide output data if the processor 111 determines that the severity of the hazard is above a certain level. This level of severity may be programmed into the wearable smart device 100 and/or selected by a user of the wearable smart device 100. In some embodiments, the wearable smart device 100 outputs different data based on the severity level. For example, a stronger vibration and/or volume of output may be provided for hazards presenting a relatively high severity level than hazards presenting a relatively low severity level. In some embodiments, the wearable smart device 100 may output navigation instructions around relatively high severity level hazards and only warn of relatively low severity level hazards.

In block 424, the processor 111 may update the memory 112 with the hazard data. The update in the memory 112 may include a type of hazard, a severity of the hazard and/or a location of the hazard. In some embodiments, audio and/or image data that is associated with the hazard may be stored in the memory 112. In this way, the wearable smart device 100 and/or another wearable smart device may later access the stored hazard data and be aware of its presence.

In some embodiments, the wearable smart device 100 may update a remote database with the hazard data. This allows the data to be received by other wearable smart devices, allowing a shared resource of hazard information to be developed and accessed by multiple wearable smart devices.

FIG. 5 illustrates an exemplary database 500 which may be stored in the memory 112. Any database discussed herein may be stored on a local memory of the wearable smart device 100 and/or may be stored remote from the wearable smart device 100 and accessed via the antenna 142 and/or the I/O port 143. Any database may be accessible by the wearable smart device 100 only or by a combination of the wearable smart device 100 and other wearable smart devices.

The database 500 stores location information, hazard types, a confidence that the hazard still exists and a severity level associated with the hazard. The first column 501 includes location information. The second column 502 lists hazard types associated with each location. The third column 504 includes an estimated confidence that the hazard still exists at the location. The fourth column 506 represents a severity level associated with each hazard. The database 500 may include more or less information than illustrated in FIG. 5. In some embodiments, the database 500 may not include a confidence value and/or a severity level. In some embodiments, the database 500 may only indicate that a hazard exists at a particular location and does not include any detail about the hazard.

The hazard type may vary from abstract hazard information, such as an indication that a hazard is in a particular location, to highly detailed information, such as the shape of the hazard, a description of the hazard, size information of the hazard or the like.

The confidence information may be determined based on the length of time since the particular entry was updated, the type of hazard, how accurate the data was when it was stored in the database 500, whether a report indicates that it still exists or has been repaired, whether another wearable smart device detected that the hazard still exists or has been removed or the like.

The severity level may be associated with a potential amount of danger presented by the hazard (the likelihood that injury will be caused by the hazard, the severity of injury if it occurs or the like). The wearable smart device 100 may include any number of severity levels. In the embodiment illustrated in FIG. 5, the wearable smart device 100 includes five severity levels with 1 being the least severe and 5 being the most severe. The severity level may be determined based on the type of hazard, the danger posed by the hazard, the confidence values and/or a variety of factors. The factors will be discussed below with reference to FIG. 7.

In some embodiments, the database 500 may be accessible by repair workers. A repair worker may repair a hazard included in the database 500 and edit the entry accordingly.

The first entry 508 illustrates an exemplary entry in the database 500. In the first column 501, the database 500 indicates that the location of the hazard is at location 1. Location 1 may be stored as coordinate values, relative position from a reference point, an address, associated with particular image data and/or audio data or the like.

The hazard type describes details of the hazard such as a low branch over the sidewalk, as indicated in the second column 502. In some embodiments, the database 500 may indicate at what height the low branch is or other information. The processor 111 may determine whether or not to output hazard data based on a comparison of the height of the wearable smart device 100 relative to the ground and the height of the branch relative to the ground. In some embodiments, the database 500 may include size information associated with the low branch.

The first entry 508 has a stored confidence value of 50%, as indicated in the third column 504. The confidence value may indicate a likelihood of danger to the user (i.e., that there is a 50% chance that the hazard will injure the user), a likelihood that the hazard is present (i.e., that there is a 50% chance that the hazard is present) or the like. The confidence value may be determined based on various factors such as whether stored data includes repair information indicating that the low branch has been removed, whether previously stored data indicates that a chainsaw was detected near the low branch, whether other wearable smart devices have uploaded the same hazard information to the database 500, whether other wearable smart devices have indicated that the branch is still present or has been removed or the like.

The first entry 508 is associated with a severity level of 4, as indicated in the fourth column 506. The severity level of 4 may indicate that the low branch presents a significant chance of injury if the user is not aware of the hazard. Further details regarding the severity level will be discussed with reference to FIGS. 6 and 7.

The second entry 510, the third entry 512 and the fourth entry 514 illustrate other exemplary entries stored in the database 500.

Figure 6:
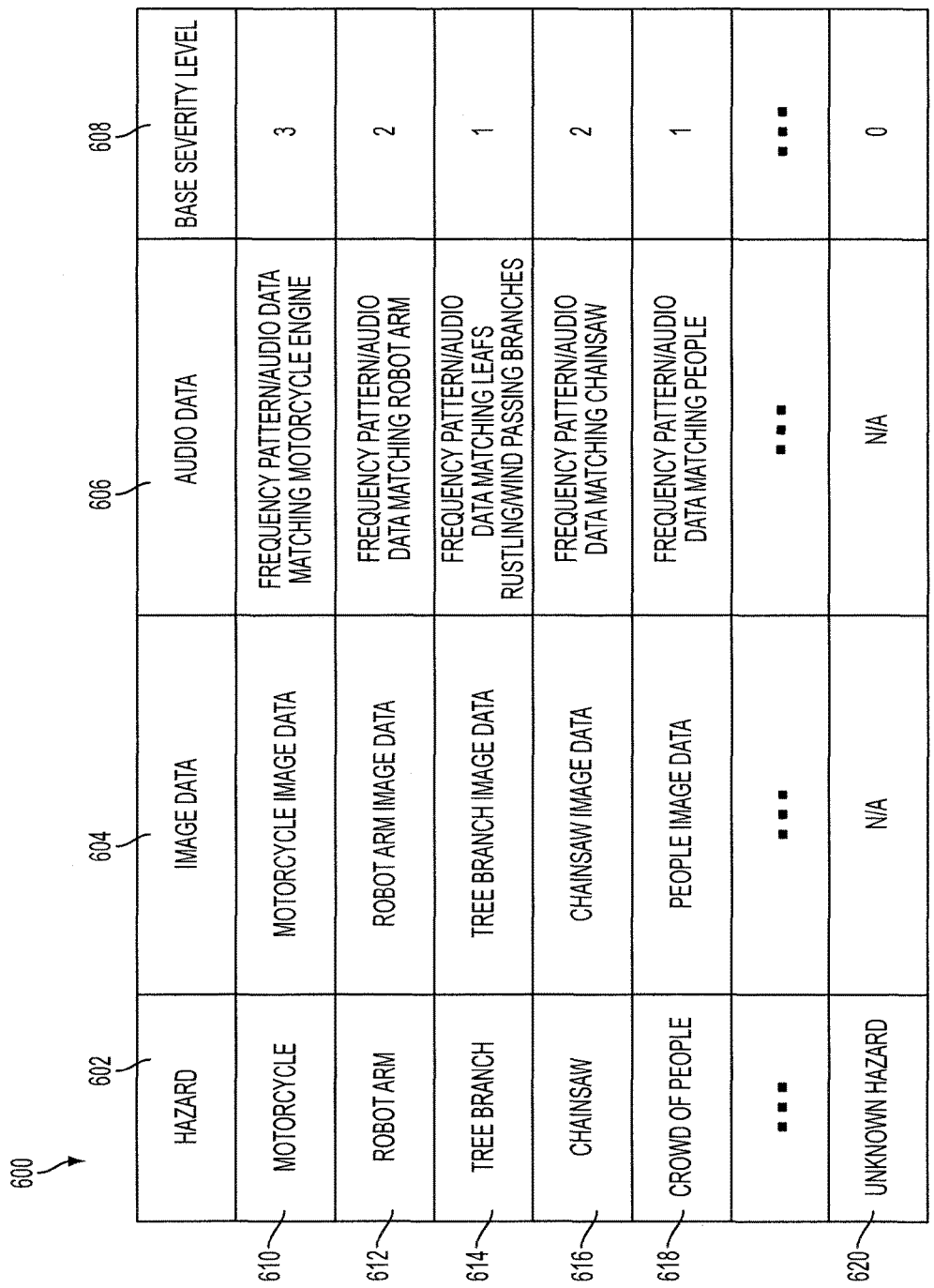
FIG. 6 illustrates another exemplary database that associates image data, audio data and base severity levels with various types of hazards according to an embodiment of the present invention.

FIG. 6 illustrates another exemplary database 600 associating image data, audio data and a base severity level with various types of hazards. The database 600 includes a first column 602 indicating the type of hazard, a second column 604 that includes image data associated with the hazard, a third column 606 that includes audio data associated with the hazard and a fourth column 608 indicating a base severity level of the hazard.

The first column 602 may include various types of hazards. The processor 111 may update the database 600 by including additional types of hazards based on detected data and/or updates to the wearable smart device 100. The hazard information may include a label for the type of hazard. In some embodiments, the hazard information includes a description of the hazard, similar to column 502 in FIG. 5.

The second column 604 may include image data associated with each type of hazard. This data may be previously detected by the stereo cameras 121 and/or the camera 122. In some embodiments, the second column 604 may include object shape data programmed into the database 600. For example, if the hazard is a motorcycle, the image data may include two wheels coupled together with an engine, such that when the stereo cameras 121 and/or the camera 122 detect image data including two wheels and an engine, the processor 111 can determine that this image data corresponds to a motorcycle. In some embodiments, the image data associated with a particular type of hazard may include more than one image for matching purposes. For example, an entry for a car may include one or more shapes corresponding to a coupe, one or more shapes corresponding to an SUV, one or more shapes corresponding to a sports car or the like.

The third column 606 includes audio data that corresponds to the type of hazard. For example, the audio data may include frequency patterns and/or particular sounds associated with a motorcycle. The processor 111 may compare detected audio data to the stored audio data in the third column 606 to determine whether the detected audio data indicates a particular type of hazard.

The fourth column 608 indicates a base severity level of the hazard. The base severity level may represent an original estimate of the severity level of the hazard. As discussed below with reference to FIG. 7, the base severity level may be adjusted based on a variety of factors.

The first entry 610 corresponds to a motorcycle hazard. In the second column 604, image data corresponding to a motorcycle may be stored. In the third column 606, the database 600 may include a frequency pattern associated with a motorcycle. The frequency pattern information may include base and/or harmonic frequencies of a motorcycle engine. The third column 606 may also include audio data that indicates the sound of a motorcycle engine. The audio data may be a prerecorded audio clip of a motorcycle engine or may be a representation of the sound of the motorcycle engine. In the fourth column 608, the database 600 indicates that a motorcycle hazard is associated with a base severity level of 3.

The second entry 612, the third entry 614, the fourth entry 616 and the fifth entry 618 illustrate other exemplary entries in the database 600.

In some embodiments, the database 600 may include an unknown hazard entry 620. If image data or audio data is detected but does not match a hazard in the database 600, then the image or audio data may be associated with the unknown hazard entry 620. In the fourth column, the base severity level of the unknown object may be associated with a severity level of 0.

FIG. 7 illustrates an exemplary database 700 associating various factors with corresponding adjustments to the severity level. Some of the factors are to be determined for all hazards whether known or unknown. Some factors may only be associated with unidentified hazards. For example, for an identified hazard, size information may have been incorporated into the base severity level determination, thus the severity level may not be adjusted based on a detected size. However, one skilled in the art will realize that any factors or severity level adjustments shown in FIG. 7 are exemplary only.

The first column 702 corresponds to whether the factor is to be applied to all hazards or only to unidentified hazards. In some embodiments, the database 700 may also include factors that are only to be applied to identified hazards. In some embodiments, the database 700 may include factors that are to be applied only to unidentified hazards, identified hazards or both.

The second column 704 illustrates various severity level factors. Whether the severity level factors are applied to the particular hazard may be determined based on a comparison of data detected from the stereo camera 121, the camera 122 and/or the microphone 131 to data stored in the memory and listed in the second column 704. For example, the processor 111 may determine a distance to the hazard based on data detected by the stereo camera 121, the camera 122 and/or the microphone 131 and compare the distance information with the factors to determine whether the detected distance matches an entry in the second column 704.

The third column 706 corresponds to severity level adjustments based on the factors. The severity level of each hazard may be adjusted based on a match with a severity level factor.

The first column 702 includes a first group 708 corresponding to all objects and a second group 710 corresponding only to unidentified objects. The first group 708 includes a factor 712 that corresponds to a determination that the detected object is within five feet of the wearable smart device 100. If this factor 712 is satisfied, then the severity level of the hazard may be increased by half of a severity level. The first group 708 also includes a factor 714 corresponding to a determination that the object is within 10 feet of the wearable smart device 100 that is associated with no adjustment of the severity level. The database 700 includes additional exemplary factors associated with all hazards.

The second group 710 includes a factor 726 indicating that the size of the detected object is greater than one cubic foot. If this factor is satisfied than the security level may be adjusted by half of a level. The second group 710 also includes a factor 728 corresponding to a determination that the object is greater than five cubic feet in size that is associated with a severity level adjustment of one. The database 700 includes additional exemplary factors associated with unidentified hazards.

FIG. 8 illustrates an exemplary database 800 that may be utilized by the processor 111 to determine an estimated distance to a hazard based on a detected volume of the hazard. The database 800 may include a first column 802 that corresponds to a particular hazard, a second column 804 that corresponds to various volumes of the hazard and a third column 806 that corresponds to an estimated distance to the hazard based on the detected volume. The first hazard, a motorcycle group 808, is associated with a first entry 810 corresponding to a volume of less than 30 decibels. The third column 806 indicates that the estimated distance to the motorcycle is greater than 50 feet if the volume is less than 30 decibels. The motorcycle group 808 also includes an entry 812 corresponding to a range between 30 and 40 decibels and indicating that the estimated distance is between 35 feet and 50 feet. The database 800 illustrates other exemplary entries associated with the motorcycle group 808 and a chainsaw 824.

In order to use the database 800, the processor 111 may receive audio data from the microphone 131. Using the database 600, the processor 111 may determine a type of, hazard based on the audio data. When the type of hazard is determined by the processor 111, the processor 111 may compare a volume of the hazard detected by the microphone 131 to the database 800 to determine an estimated distance to the hazard.

Figure 9:
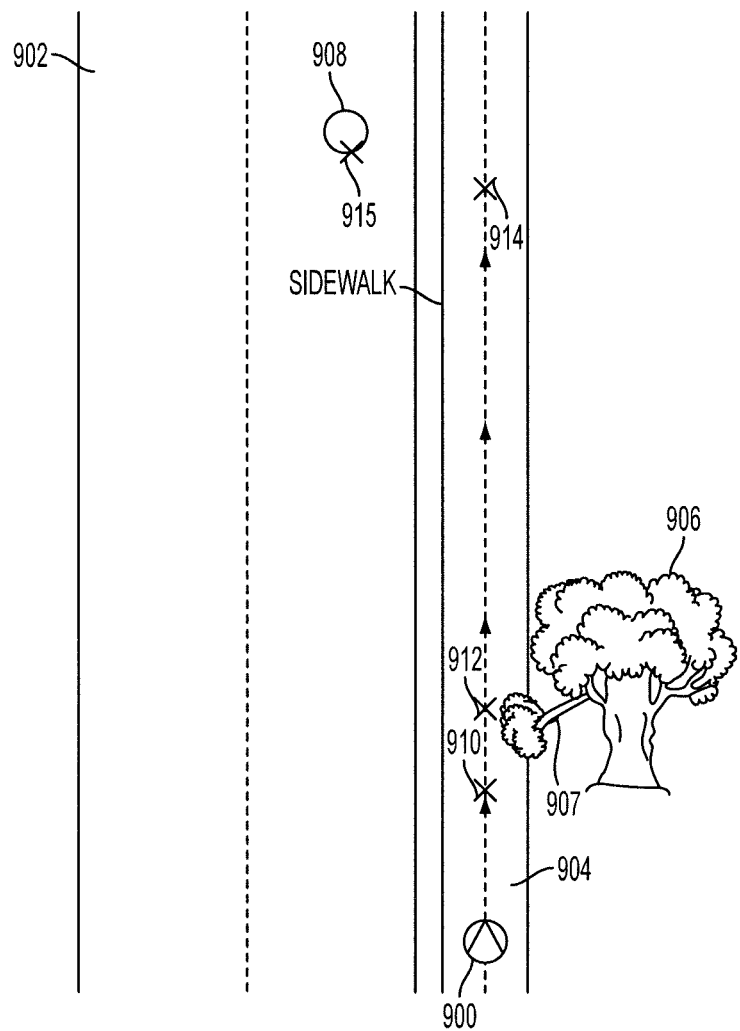
FIG. 9 illustrates an exemplary wearable smart device, similar to the wearable smart device illustrated in FIG. 1, utilizing a method similar to the method illustrated in FIG. 4 according to an embodiment of the present invention.

FIG. 9 illustrates an exemplary wearable smart device 900, similar to the wearable smart device 100, utilizing a method similar to the method 400. In the example illustrated in FIG. 9, a user of the wearable smart device 900 (and thus the wearable smart device 900) is traveling down a sidewalk 904 that is adjacent to a street 902. A tree 906 adjacent to the sidewalk 904 includes a low hanging branch 907 that hovers over the sidewalk 904 at location 912.

As the wearable smart device 900 travels down the sidewalk 904 and reaches location 910, microphones of the wearable smart device 900 may detect leaves rustling through the tree 906. Cameras and/or stereo cameras of the wearable smart device 900 may then be directed towards the sound of the rustling leaves. As the cameras are focused towards the low hanging branch 907, they detect image data corresponding to the low hanging branch. Because the low hanging branch 907 does not create much sound, the processor 111 may determine that the cameras detect higher quality data than the microphones.

The image data and the audio data may be compared to a database, such as the database 600, to determine if the detected data matches stored hazard data in the memory 112. As the database 600 includes a third entry 614 corresponding to a tree branch, the processor 111 finds the match and indicates that the detected data corresponds to the tree branch. Using the database 600, the processor 111 may determine that the low hanging branch 907 corresponds with a base severity level of 1.

The image data and the audio data may then be compared to a database, such as the database 700, to determine which, if any, factors are met. At location 910, the wearable smart device 900 is within 10 feet of the low hanging branch 907. This does not adjust the base severity level of 1. However, the wearable smart device 900 is approaching the low hanging branch 907, causing the relative distance between the low hanging branch 907 and the wearable smart device 900 to decrease. This increases the severity level by half of a level. As the low hanging branch 907 is positioned directly over the sidewalk 904, the wearable smart device 900 may determine that the low hanging branch 907 is directly approaching the wearable smart device 900, increasing the severity level by one. At this point, the wearable smart device 900 may output data indicating the hazard of the low hanging branch 907 to the user via speakers and/or vibration units. In some embodiments, the wearable smart device 900 may also provide navigation instructions to direct the user around the low hanging branch 907.

The wearable smart device 900 may then update a database, such as the database 500, to include the hazard of the low hanging branch 907 at the location 912. Because the severity level is 2.5, the wearable smart device 900 may alert the user to the hazard if the wearable smart device 900 is designed to alert the user to hazards having a severity level of 2.5 or higher.

As the wearable smart device 900 reaches the location 914, the processor 111 of the wearable smart device 900 may compare the detected location data to a database, such as the database 500, to determine if any hazards are present at or near the location 914. The processor 111 may then determine that the location 915, near the location 914, corresponds to an uncovered pothole 908. The processor 111 may then determine the severity level of the uncovered pothole 908 based on the entry in the database 500 and factors and output hazard data based on the type of hazard and the severity level of the hazard. The wearable smart device 900 may also detect additional image and audio data and compare the data to a database, such as database 600, to verify the hazard and/or to detect additional hazards.

Figure 10:
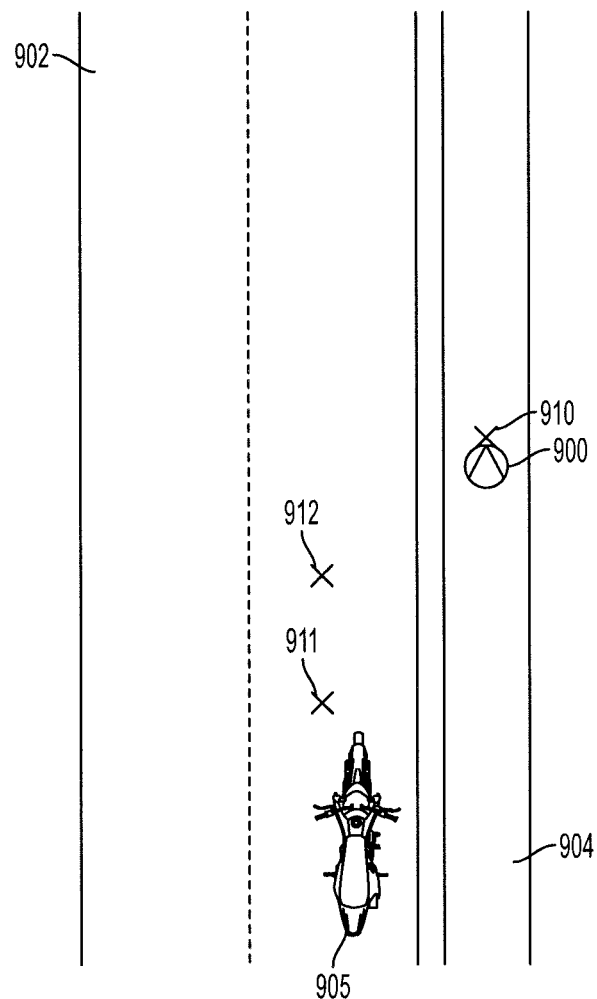
FIG. 10 illustrates another example of the wearable smart device of FIG. 9 utilizing a method similar to the method illustrated in FIG. 4 according to an embodiment of the present invention.

FIG. 10 illustrates another example of the wearable smart device 900 utilizing a method similar to the method 400. In FIG. 10, the wearable smart device 900 remains at a location 910 on the sidewalk 904. A motorcycle 905 may be approaching the location 912. One or more microphones of the wearable smart device 900 may detect audio data corresponding to the motorcycle 905. The microphone of the wearable smart device 900 may also detect a volume of the motorcycle 905 such that the processor 111 may determine a distance to the motorcycle 905 based on the detected volume.

As the motorcycle 905 approaches the location 911, image data detected by the wearable smart device 900 may be of low quality as the wearable smart device 900 may not include rear-facing cameras. Accordingly, the microphones may provide higher quality data than the cameras. The audio data and the image data may be compared to a database such as the database 600 to determine that the object at the location 911 is the motorcycle 905. The processor 111 of the wearable smart device 900 may then compare the detected data with the severity level factors listed in the database 700 to determine a severity level. At this point, more weight may be given to data detected by the microphones.

As the motorcycle 905 reaches the location 912, the image data may be of higher quality than the audio data. The wearable smart device 900 may then place more emphasis on data detected from the cameras than from the microphones. As the motorcycle 905 changes location relative to the wearable smart device 900, the severity level of the motorcycle 905 may be continuously updated. When the motorcycle reaches a predetermined severity level, distance from the wearable smart device 900 or the like, the wearable smart device 900 may output a warning indicating the hazard presented by the motorcycle 905.

Figure 11:
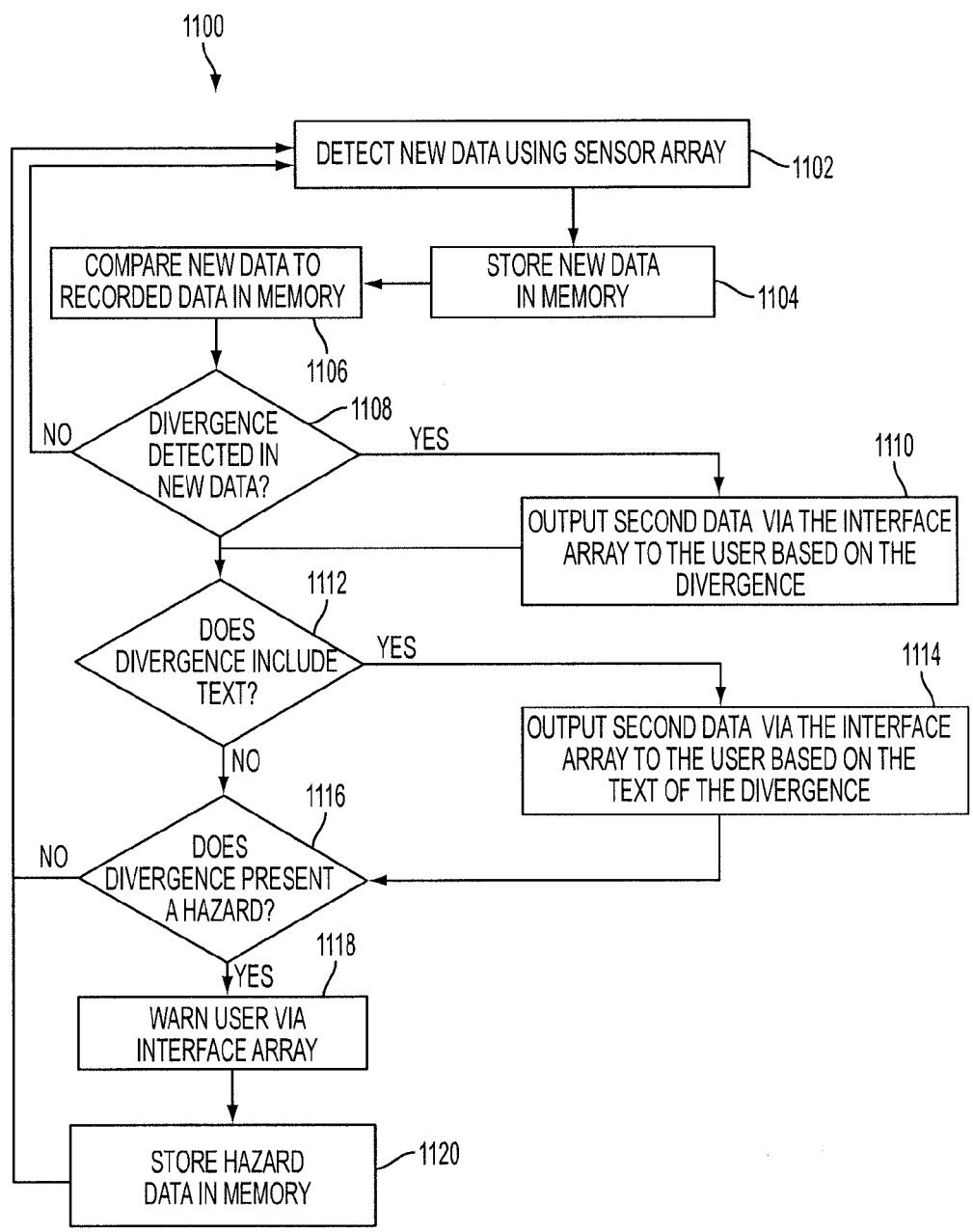
FIG. 11 illustrates another exemplary method that may be performed by a wearable smart device for safety monitoring and alerting a user of a hazard based on divergence data according to an embodiment of the present invention.

FIG. 11 illustrates another exemplary method 1100 that may be performed by the wearable smart device 100 for safety monitoring and alerting the user of a hazard. The process begins in block 1102, where new data is detected by the wearable smart device 100 using the sensor array 120. This data may include any data detected by the sensor array 120, such as visual data (streets, sidewalks, people), position data (location of the user, direction of travel), audio data (such as a moving car sound, a siren, an alarm), or any other data. In block 1104, this new data is stored in the memory 112.

In block 1106, this new data is compared to data recorded in the memory 112. The data recorded in the memory 112 may include data captured by the wearable smart device 100 and/or another wearable smart device. In some embodiments, the memory 112 includes a database accessible by multiple wearable smart devices such that the data recorded in the memory 112 may have been detected by another wearable smart device. The data recorded in the memory 112 may also include data captured at the same location or nearby at a time prior to the current time, such as milliseconds, seconds, or minutes prior to the current time.

In block 1108, it is determined whether or not a divergence is detected between the new data and the data recorded in the memory 112. This divergence may include data indicating that a new object is in the field of view of the wearable smart device 100 that was not previously detected. A divergence may also include data indicating that a previously-present object is no longer in the field of view. The divergence may also include a new sound, such as a police siren, a motorcycle or the like.

In block 1110, if a divergence is detected in the new data, a second data may be output to the user via the interface array 130 based on this divergence. Assume that a divergence includes a boulder in the middle of the sidewalk. In response to detecting a divergence between the image with the boulder and the image without the boulder, the wearable smart device 100 may provide data to the user indicating the divergence. For example, the wearable smart device 100 may, using the speaker 132, inform the user that an object matching the shape of a boulder is at a particular distance and/or direction from the user. Alternately or additionally, the wearable smart device 100 may provide haptic feedback to the user indicating the distance and/or direction of the boulder.

In block 1112, it is determined whether or not the divergence includes text. For example, the divergence may be a sign or police tape including text. The processor 111 may make this determination by comparing the new detected data to data indicating the shape of text characters to determine if any matches exist.

In block 1114, if is determined that the divergence includes text, then the wearable smart device 100 may output data to the user via the interface array 130 based on the text of the divergence. The data may include audio data indicating the content of the text of the divergence.

In block 1116, it is determined whether or not the divergence presents a hazard. The memory 112 may have stored data which can be compared to detected data in order to determine if a divergence is hazardous. For example, the memory 112 may include visual and/or audio data associated with particular hazards, and if a match is made, the processor 111 may determine that the divergence is dangerous. For example, the memory 112 may include visual data associated with the shape of a caution sign and the word caution, and that this data is an indicator of a hazard.

As another example, instead of having data representing a dangerous object, the memory 112 may store situational data. For example, the wearable smart device 100 may recognize that if a large object is in the middle of a sidewalk that the user is walking along, the object may present a hazard. Another example of situational data is that the wearable smart device 100 may recognize that if visual data of an area had been previously sensed and stored, and the visual data of the area is significantly different in the present sensing of the area, then a danger may exist.

In block 1118, if it is determined that the divergence does present a hazard, the wearable smart device 100 may warn the user via the interface array 130. The warning may include audio output via the speaker 132 informing the user that a hazard exists and the location of the hazard. The warning may also include the type of hazard and/or the severity of the hazard. If the wearable smart device 100 detects a caution sign that reads "potholes in the sidewalk," then the wearable smart device 100 may output data to the user informing the user that potholes exist in the sidewalk. The wearable smart device 100 may also inform the user of the locations of the hazards as the wearable smart device 100 detects them. In some embodiments, the wearable smart device 100 may provide vibrational data to the user via the vibration unit 133 indicating the hazard information.

In block 1120, any hazard information determined in block 1116 is stored in the memory 112. This allows the wearable smart device 100 to easily determine the location and the type of the hazard by comparing or looking up the location in the memory 112. In some embodiments, the hazard information is stored in a cloud and is accessible by other wearable smart devices. This allows a database of hazard location data and information to be created and accessed by multiple wearable smart devices.

Figure 12:
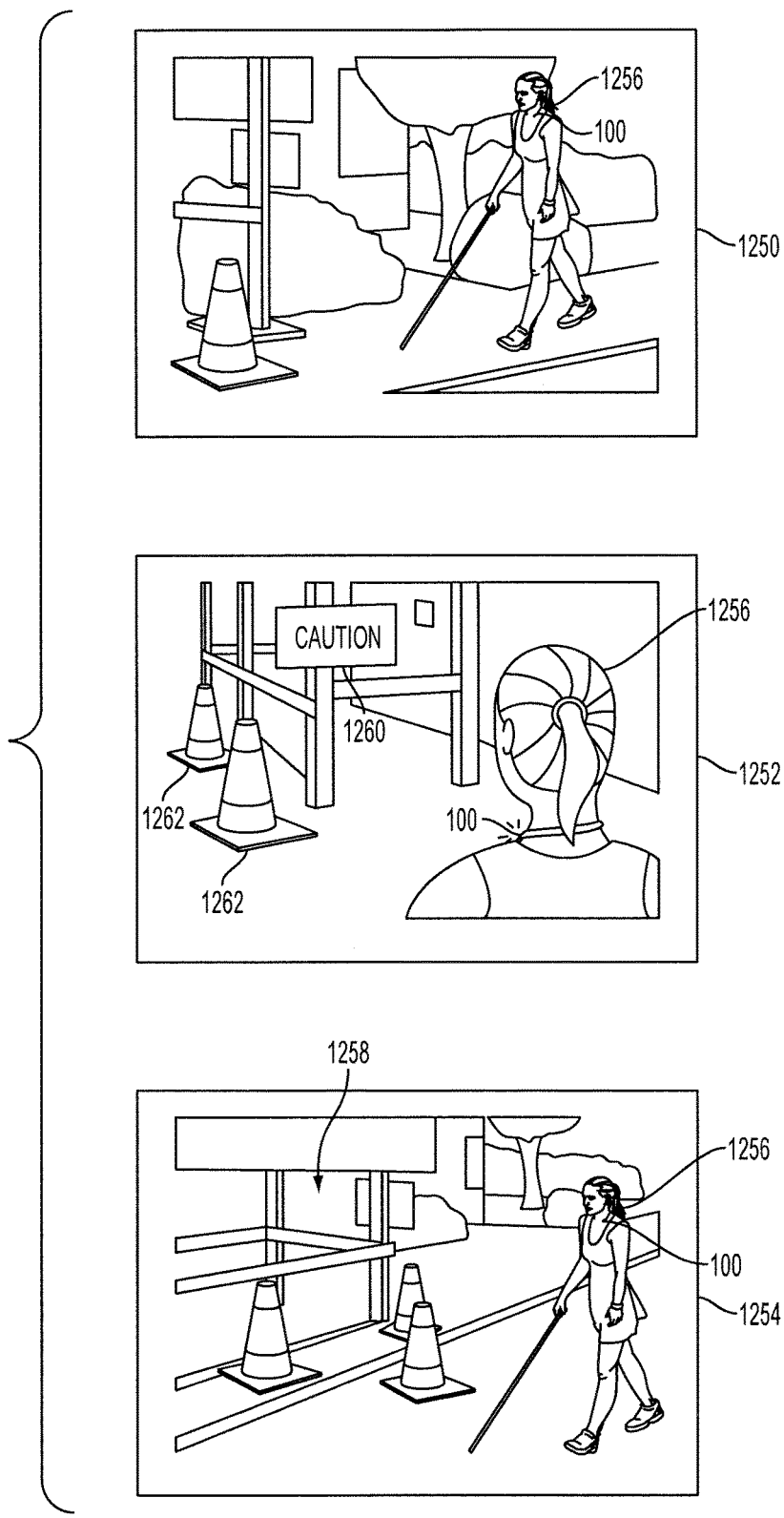
FIG. 12 illustrates an exemplary use of the method illustrated in FIG. 11 according to an embodiment of the present invention.

FIG. 12 illustrates an exemplary use of the method 1100 of FIG. 11. In frame 1250 of FIG. 12, a user 1256 of the wearable smart device 100 is walking along a sidewalk. The memory 112 includes data detected by the sensor array 120 during the previous trips along the sidewalk that does not include any hazard information.

In frame 1252, a hazard 1258 is present on the sidewalk in the direction of travel of the user. The hazard includes a caution sign 1260 as well as two caution or orange cones 1562. When the hazard is in the field of view of the wearable smart device 100, the wearable smart device 100 may compare the detected data to the stored data. The processor 111 may determine that the hazard is a divergence and it may provide data to the user 1256 based on the divergence. The data may include a description of the two cones 1562, the fact that the caution sign 1260 is present and any other diversion data. The wearable smart device 100 may also determine that the diversion includes text. The wearable smart device 100 may provide the user 1256 data based on the text, such as reading the text to the user.

The wearable smart device 100 may determine that the caution sign 1560 and/or the caution cone 1562 present a hazard. The wearable smart device 100 may then provide data to the user 1256 indicating that the hazard 1258 is present. The wearable smart device 100 may output audio and/or haptic data indicating the type and/or location of the hazard 1258 to the user 1256.

In frame 1254, the user may utilize audio and/or haptic output from the wearable smart device 100 to navigate around the hazard 1258. The hazard is towards the right side of the user 1256. Accordingly, the wearable smart device 100 may vibrate more on the right side than the left, indicating that the hazard is on the right, or vibrate on the left side more than the right, indicating that the user should move left.

Exemplary embodiments of the methods/systems have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A wearable computing device for providing hazard warning information comprising:
a microphone configured to detect audio data associated with a potential hazard;
a camera configured to detect image data associated with the potential hazard; and
a processor coupled to the microphone and the camera and configured to determine which of the detected audio data or the detected image data has a higher quality, and to determine whether the potential hazard presents a real hazard to a user based on the detected audio data and the detected image data such that more weight is provided to whichever of the detected audio data or the detected image data has the higher quality.

2. The wearable computing device of claim 1 further comprising a memory coupled to the processor and configured to store memory audio data and memory image data associated with at least one hazard, and wherein the processor is configured to determine whether the potential hazard presents the real hazard by comparing at least one of the detected audio data or the detected image data to at least one of the memory audio data or the memory image data.

3. The wearable computing device of claim 1 further comprising an inertial measurement unit (IMU) coupled to the processor and configured to detect motion data and a GPS sensor configured to detect location data and wherein the processor is further configured to determine a current location of the wearable computing device based on at least two of the detected motion data, the detected location data, the detected audio data, and the detected image data.

4. The wearable computing device of claim 3 further comprising a memory coupled to the processor and configured to store a stored location and at least one hazard associated with the stored location, and wherein the processor is further configured to determine whether the at least one hazard presents a danger to the user based on a comparison of the current location to the stored location.

5. The wearable computing device of claim 1 wherein the microphone includes two microphones spaced apart and the processor is further configured to determine a direction of the potential hazard based on the detected audio data.

6. The wearable computing device of claim 5 wherein the processor is further configured to instruct the camera to focus towards the direction of the potential hazard in response to determining the direction of the potential hazard.

7. The wearable computing device of claim 1 wherein the processor is further configured to determine a distance to the potential hazard based on a volume of the detected audio data.

8. The wearable computing device of claim 1 wherein the processor is further configured to determine a severity level of the potential hazard based on at least one factor.

9. The wearable computing device of claim 8 wherein the at least one factor includes a distance to the potential hazard, whether a distance between the potential hazard and the user is decreasing, a size of the potential hazard, or an audio volume of the potential hazard.

10. The wearable computing device of claim 1 wherein the higher quality corresponds to at least one of a lack of obstruction of the detected audio data or the detected image data, an accuracy of the detected audio data or the detected image data, or a match of the detected audio data or the detected image data to data stored in a memory.

11. A wearable computing device for providing hazard warnings comprising:
    an upper portion having a first end and a second end;
    a first lower portion coupled to the first end of the upper portion;
    a second lower portion coupled to the second end of the upper portion;
    at least one microphone positioned on the first lower portion, the second lower portion or the upper portion and configured to detect audio data associated with a potential hazard;
    a camera positioned on the first lower portion or the second lower portion and configured to detect image data associated with the potential hazard; and
    a processor coupled to the camera and the at least one microphone and configured to determine which of the detected audio data or the detected image data has a higher quality, and to determine whether the potential hazard presents a real hazard to a user by analyzing whichever of the detected audio data or the detected image data has the higher quality.

12. The wearable computing device of claim 11 further comprising a memory coupled to the processor and configured to store memory audio data and memory image data associated with at least one hazard and wherein the processor is configured to determine whether the potential hazard presents the real hazard by comparing at least one of the detected audio data or the detected image data to at least one of the memory audio data or the memory image data.

13. The wearable computing device of claim 11 wherein the at least one microphone includes two microphones and the processor is further configured to determine a direction of the potential hazard based on the detected audio data.

14. The wearable computing device of claim 13 wherein the processor is further configured to cause the camera to focus towards the direction of the potential hazard in response to determining the direction of the potential hazard.

15. The wearable computing device of claim 11 wherein the processor is further configured to determine a distance to the potential hazard based on a volume of the detected audio data.

16. The wearable computing device of claim 11 wherein the processor is further configured to determine a severity level of the potential hazard based on at least one of a distance to the potential hazard, whether the potential hazard is approaching the user, a size of the potential hazard or an audio volume of the potential hazard.

17. The wearable computing device of claim 11 wherein the higher quality corresponds to at least one of a lack of obstruction of the detected audio data or the detected image data, an accuracy of the detected audio data or the detected image data, whether the detected audio data or the detected image data fails to indicate that the potential hazard is present, or a match of the detected audio data or the detected image data to data stored in a memory.

18. A method for providing hazard warnings to a user of a wearable computing device comprising:
    detecting, by at least two microphones, audio data associated with a potential hazard and including volume information;
    detecting, by a camera, image data associated with the potential hazard;
    determining, by a processor, whether the detected audio data or the detected image data has a higher quality; and
    determining, by the processor, whether the potential hazard presents a real hazard to the user based on the detected audio data and the detected image data by providing more weight to whichever of the detected audio data or the detected image data has the higher quality.

19. The method of claim 18 wherein the higher quality corresponds to at least one of a lack of obstruction of the detected audio data or the detected image data, an accuracy of the detected audio data or the detected image data, whether the detected audio data or the detected image data fails to indicate that the potential hazard is present, or a match of the detected audio data or the detected image data to data stored in a memory.

20. The method of claim 18 further comprising storing, in a memory, stored audio data and stored image data associated with at least one hazard, and wherein determining whether the potential hazard presents the real hazard is based on a comparison of at least one of the detected audio data or the detected image data to at least one of the stored audio data or the stored image data.

21. A method for providing hazard warnings to a user of a wearable smart device comprising:
    storing, in a memory, hazard data;
    detecting, by a microphone, audio data associated with a potential hazard;
    detecting, by a camera, image data associated with the potential hazard;
    determining, by a processor,
    which of the detected audio data or the detected image data has a higher quality; and
    determining, by the processor, whether the potential hazard presents a real hazard to the user based on which of the detected audio data or the detected image data has the higher quality.

22. The method of claim 21 further comprising generating, by a pair of vibration units, haptic feedback indicating a presence of the potential hazard in response to determining that the potential hazard presents the real hazard to the user.

* * * * *